US012495159B1

(12) United States Patent
Zhao et al.

(10) Patent No.: US 12,495,159 B1
(45) Date of Patent: Dec. 9, 2025

(54) MAPPING WIDE ANGLE MODES TO INTRA PREDICTION MODES FOR A PARTITION OF A CODING BLOCK

(71) Applicant: Tencent America LLC, Palo Alto, CA (US)

(72) Inventors: Liang Zhao, Sunnyvale, CA (US); Xin Zhao, San Diego, CA (US); Xiang Li, Saratoga, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 134 days.

(21) Appl. No.: 17/975,359

(22) Filed: Oct. 27, 2022

Related U.S. Application Data

(63) Continuation of application No. 16/783,388, filed on Feb. 6, 2020, now Pat. No. 11,533,506.
(Continued)

(51) Int. Cl.
*H04N 19/593* (2014.01)
*H04N 19/176* (2014.01)
*H04N 19/184* (2014.01)

(52) U.S. Cl.
CPC ......... *H04N 19/593* (2014.11); *H04N 19/176* (2014.11); *H04N 19/184* (2014.11)

(58) Field of Classification Search
CPC ... H04N 19/593; H04N 19/176; H04N 19/184
See application file for complete search history.

(56) References Cited

U.S. PATENT DOCUMENTS 9,621,888 B2    4/2017   Jeon et al.
9,674,520 B2    6/2017   Lim et al.
(Continued)

FOREIGN PATENT DOCUMENTS

EP    3276958 A1    1/2018
EP    3598757 A1    1/2020
(Continued)

OTHER PUBLICATIONS

Korean Office Action issued Apr. 27, 2023 in Application No. 10-2021-7017457 (8 pages).
(Continued)

*Primary Examiner* — Richard A Hansell, Jr.
(74) *Attorney, Agent, or Firm* — ARENTFOX SCHIFF LLP

(57) ABSTRACT

A method for video decoding includes decoding prediction information that indicates a partition of the current block and indicates an index indicating a first intra prediction mode in a first set of intra prediction modes for a first partition of the current block. The method further includes, when the first partition has a non-square shape, remapping the first intra prediction mode to a second intra prediction mode based on an aspect ratio of the first partition. When the aspect ratio of the first partition is out of a specific range, a number of intra prediction modes in the first set of intra prediction modes that are replaced by wide-angle intra prediction modes is fixed to a pre-defined number. The method further includes decoding at least the first partition according to the first intra prediction mode or the second intra prediction mode.

20 Claims, 22 Drawing Sheets

Related U.S. Application Data

(60) Provisional application No. 62/803,231, filed on Feb. 8, 2019.

(56) References Cited

U.S. PATENT DOCUMENTS

| | | | |
|---|---|---|---|
| 11,330,299 B2* | 5/2022 | Huo | H04N 19/119 |
| 2013/0107950 A1 | 5/2013 | Guo et al. | |
| 2013/0107959 A1 | 5/2013 | Park et al. | |
| 2013/0136175 A1 | 5/2013 | Wang et al. | |
| 2016/0021389 A1 | 1/2016 | Suzuki et al. | |
| 2017/0034531 A1 | 2/2017 | Suzuki et al. | |
| 2017/0127082 A1 | 5/2017 | Chen et al. | |
| 2017/0272745 A1 | 9/2017 | Liu et al. | |
| 2018/0124398 A1 | 5/2018 | Park et al. | |
| 2019/0007688 A1* | 1/2019 | Zhang | H04N 19/70 |
| 2020/0228832 A1 | 7/2020 | Tsai et al. | |
| 2021/0006799 A1* | 1/2021 | Lee | H04N 19/46 |
| 2021/0243429 A1* | 8/2021 | Lee | H04N 19/105 |
| 2022/0046244 A1* | 2/2022 | Rath | H04N 19/11 |
| 2024/0137538 A1* | 4/2024 | Ndong | B01J 20/3212 |

FOREIGN PATENT DOCUMENTS

| | | | |
|---|---|---|---|
| EP | 3627835 A1 | 3/2020 | |
| KR | 1020180035299 A | 3/2018 | |
| KR | 20180107762 A | 10/2018 | |
| WO | 2018127624 A1 | 7/2018 | |
| WO | 2019022537 A1 | 1/2019 | |
| WO | WO-2020072249 A1 * | 4/2020 | H04N 19/176 |
| WO | WO-2020140217 A1 * | 7/2020 | H04N 19/423 |

OTHER PUBLICATIONS

Chen et al., "Algorithm description for Versatile Video Coding and Test Model 3 (VTM 3)," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L1002-v1, 6 pages.

Extended European Search Report in EP20752148.5, mailed Mar. 25, 2021, 9 pages.

Hernandez et al., "CE3: Intra Sub-Partitions Coding Mode (Tests 1.1.1 and 1.1.2)," Joint Video Experts Team (JVET) of ITU-T SG 16 WP 3 and ISO/IEC JTC 1/SC 29/WG 11, 13th Meeting: Marrakech, MA, Jan. 9-18, 2019, Document: JVET-M0102-v5, 9 pages.

Hernandez et al., "CE3: Line-based Intra Coding mode (Tests 2.1.1 and 2.1.2)," Joint Video Experts Team (JVET) of ITU-T SG 16 WP 3 and ISO/IEC JTC 1/SC 29/WG 11, 12th Meeting: Macao, CN, Oct. 3-12, 2018, Document: JVET-L0076-v2, 9 pages.

International Search Report and Written Opinion in PCT/US2020/017252, mailed Jun. 22, 2020, 14 pages.

Kamp et al., "Decoder side motion vector derivation for inter frame video coding," 15th IEEE International Conference on Image Processing, Oct. 2008, 4 pages.

Office Action in JP2021531587, mailed Jul. 19, 2022, 5 pages.

* cited by examiner

MAPPING WIDE ANGLE MODES TO INTRA PREDICTION MODES FOR A PARTITION OF A CODING BLOCK

INCORPORATION BY REFERENCE

This application is a continuation of U.S. application Ser. No. 16/783,388, filed on Feb. 6, 2020, which claims the benefit of priority to U.S. Provisional Application No. 62/803,231, "IMPROVED INTRA PREDICTION FOR INTRA SUB-PARTITIONS CODING MODE" filed on Feb. 8, 2019. The entire disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal through compression. Compression can help reduce the aforementioned bandwidth and/or storage space requirements, in some cases by two orders of magnitude or more. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 2 shows a schematic (201) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

SUMMARY

Aspects of the disclosure provide methods and apparatuses for video encoding/decoding. In some examples, an apparatus for video decoding includes receiving circuitry and processing circuitry. The processing circuitry decodes prediction information of a current block from a coded video bitstream. In some embodiments, the processing circuitry determines a first sub-partition and a second sub-partition of the current block based on the decoded prediction information, and then reconstructs the first sub-partition and the second sub-partition of the current block based on at least a neighboring sample of the current block that is out of a neighboring area of at least one of the first sub-partition and the second sub-partition.

In an embodiment, the current block is vertically split into at least the first sub-partition and the second sub-partition, and the neighboring sample is a bottom left neighboring sample of the current block and is out of the neighboring area of at least one of the first sub-partition and the second sub-partition. In another embodiment, the current block is horizontally split into at least the first sub-partition and the second sub-partition, and the neighboring sample is a top right neighboring sample of the current block and is out of the neighboring area of at least of the first sub-partition and the second sub-partition.

In some embodiments, the prediction information is indicative of a first intra prediction mode in a first set of intra prediction modes for intra prediction of a square shape. The processing circuitry remaps the first intra prediction mode to a second intra prediction mode in a second set of intra prediction modes for intra prediction of a non-square shape based on a shape of the first sub-partition of the current block, and reconstructs at least a sample of the first sub-partition according to the second intra prediction mode.

In an embodiment, when an aspect ratio of the first sub-partition is out of a specific range, a number of a subset of intra prediction modes in the first set of intra prediction modes that are replaced by wide-angle intra prediction modes in the second set of intra prediction modes is fixed to a pre-defined number. In an example, the pre-defined number is one of 15 and 16.

In another embodiment, the processing circuitry determines an angle parameter associated with the second intra prediction mode based on a lookup table having a precision of 1/64.

In an example, when an aspect ratio of the first sub-partition equals to 16 or 1/16, a number of replaced intra prediction modes from the first set to the second set is 13. In another example, when the aspect ratio of the first sub-partition equals to 32 or 1/32, a number of replaced intra prediction modes from the first set to the second set is 14. In another example, when the aspect ratio of the first sub-partition equals to 64 or 1/64, a number of replaced intra prediction modes from the first set to the second set is 15.

In some embodiments, the processing circuitry determines a partition orientation based on size information of the current block, and decodes a signal from the coded bitstream that is indicative of a number of sub-partitions for partitioning the current block in the partition orientation.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 23 shows an example of reference samples in an ISP mode for planar intra prediction.

FIG. 24 shows a flow chart outlining a process example according to some embodiments of the disclosure.

FIG. 25 shows a flow chart outlining a process example according to some embodiments of the disclosure.

FIG. 26 is a schematic illustration of a computer system in accordance with an embodiment.

DETAILED DESCRIPTION OF EMBODIMENTS

Figure 1:
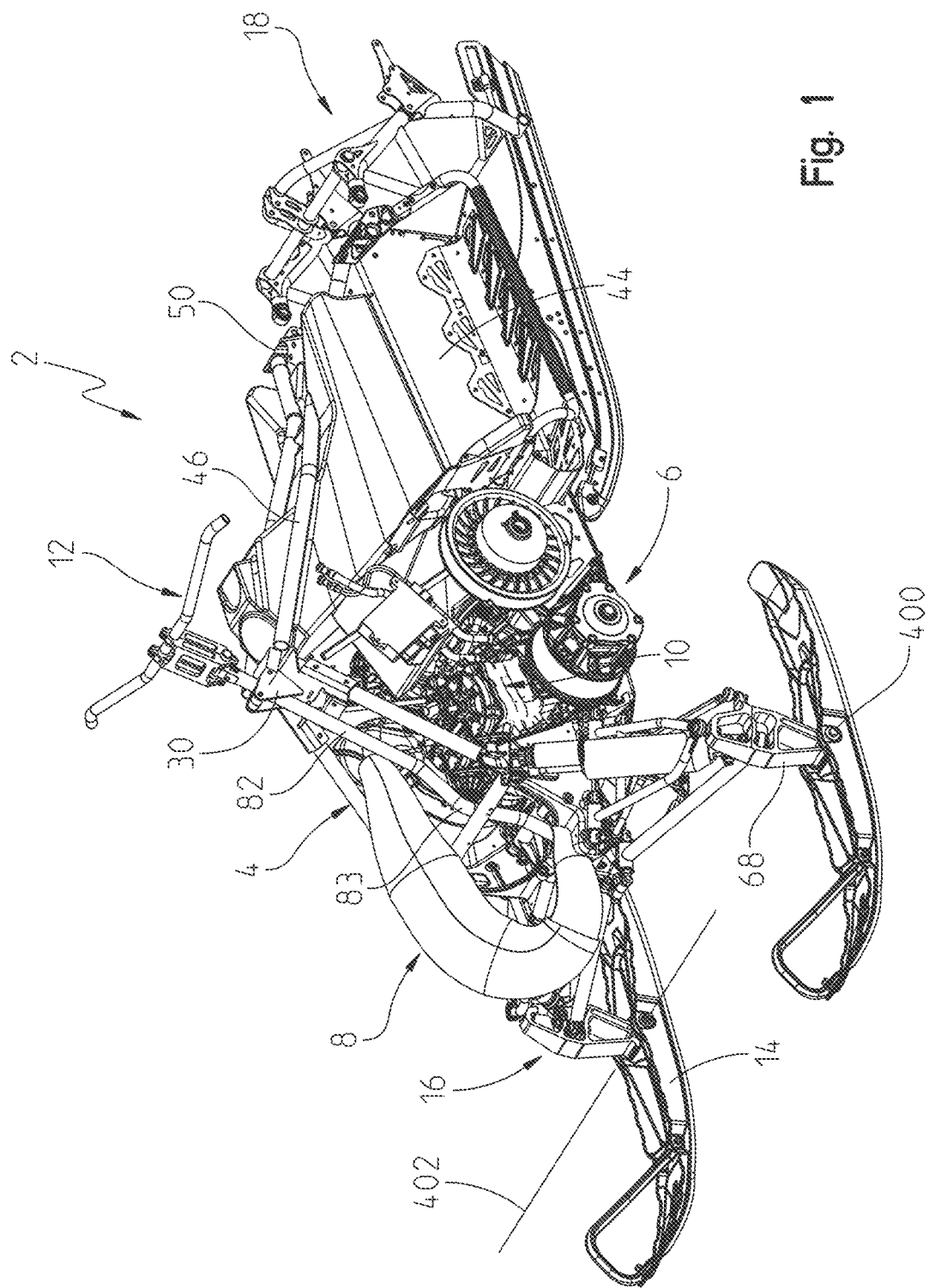
FIG. 1 is a schematic illustration of an exemplary subset of intra prediction modes.
Figure 2:
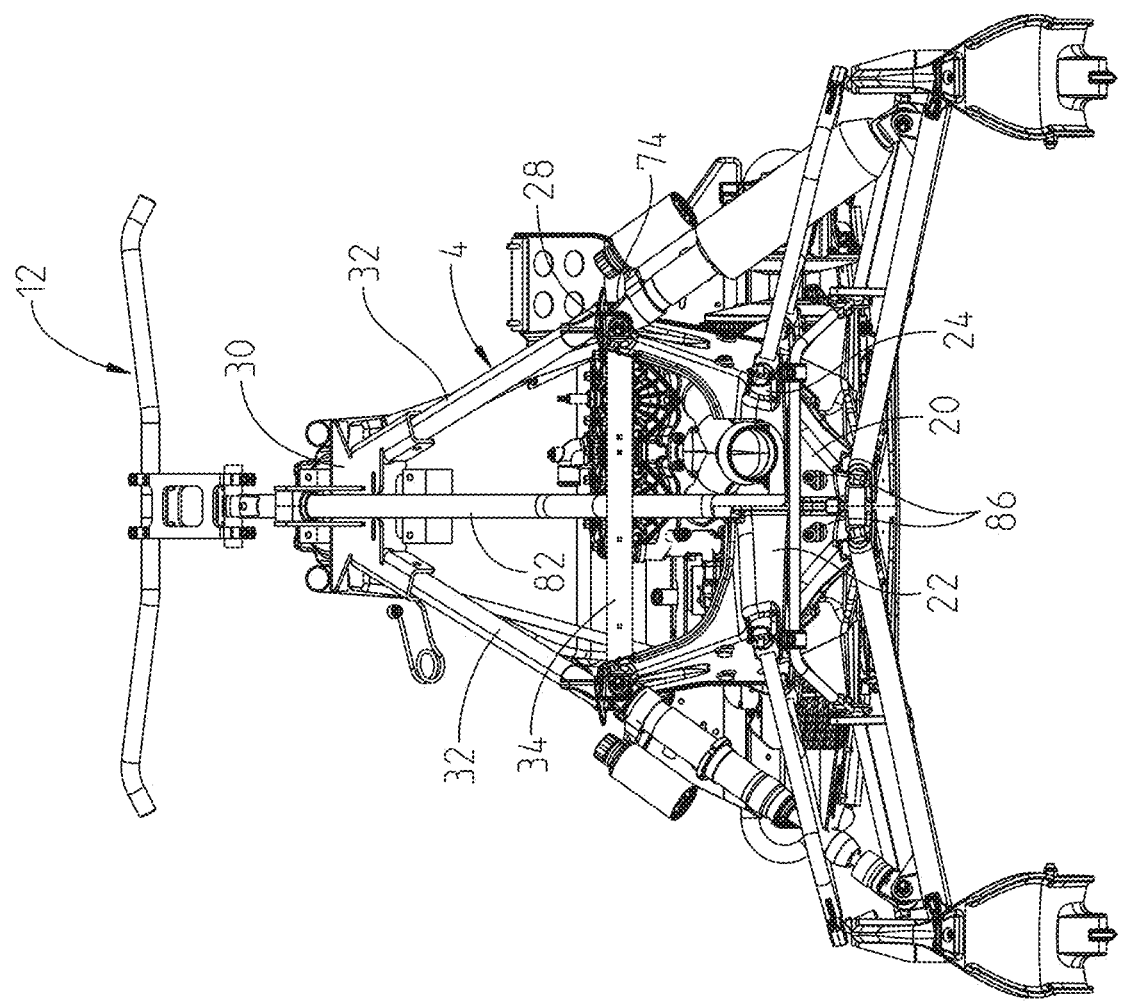
FIG. 2 is an illustration of exemplary intra prediction directions.
Figure 3:
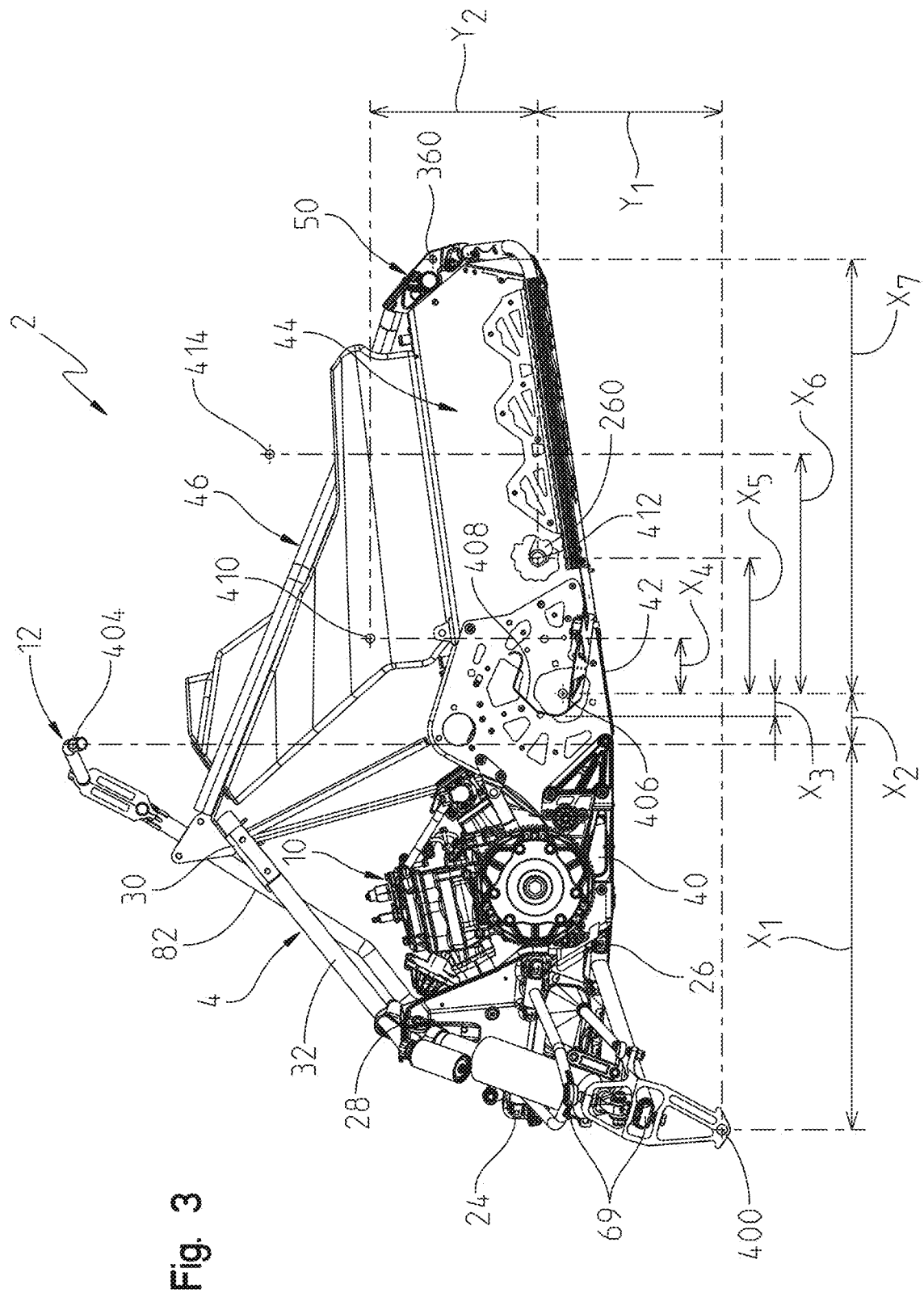
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
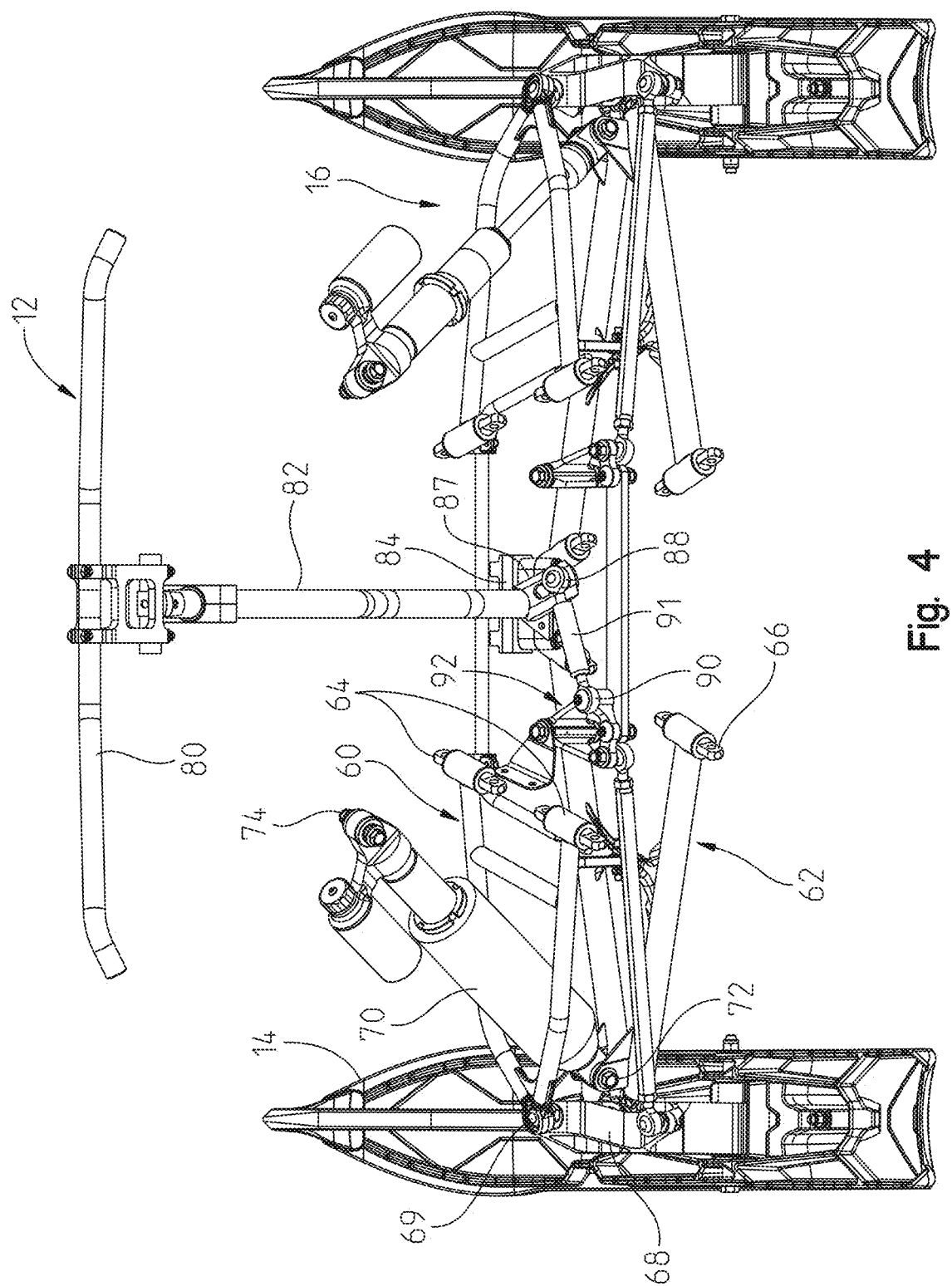
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
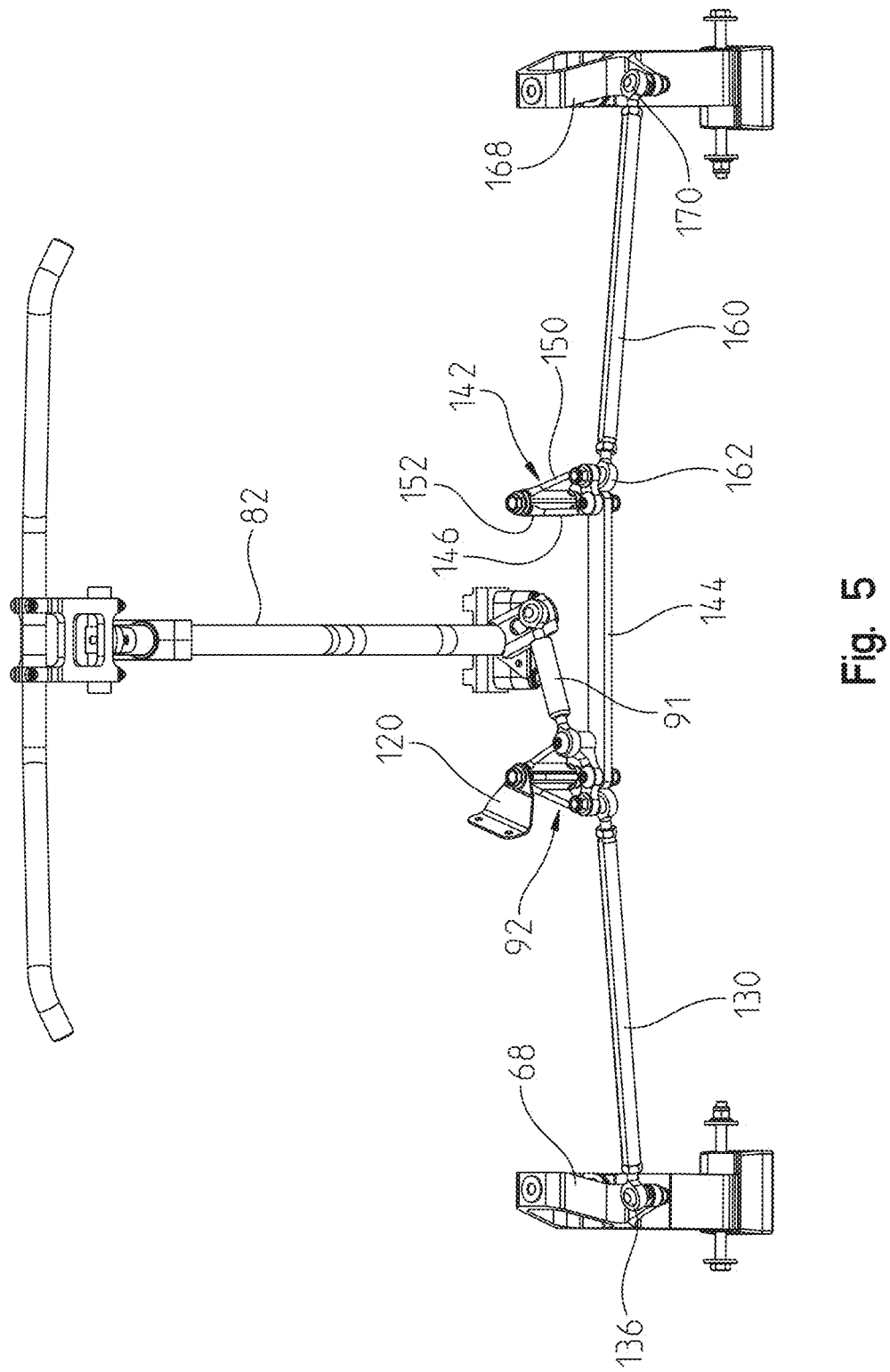
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal or residue information) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
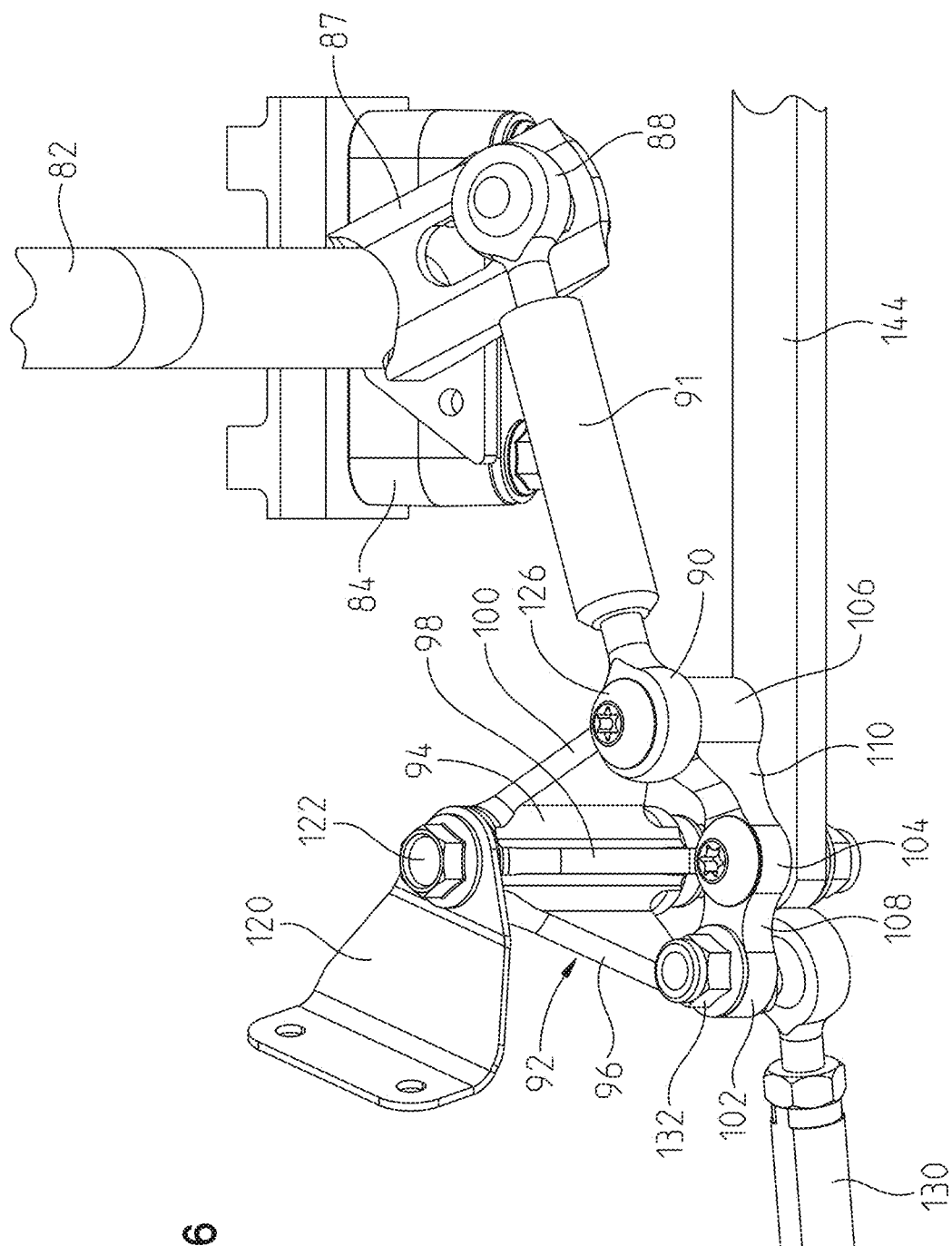
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
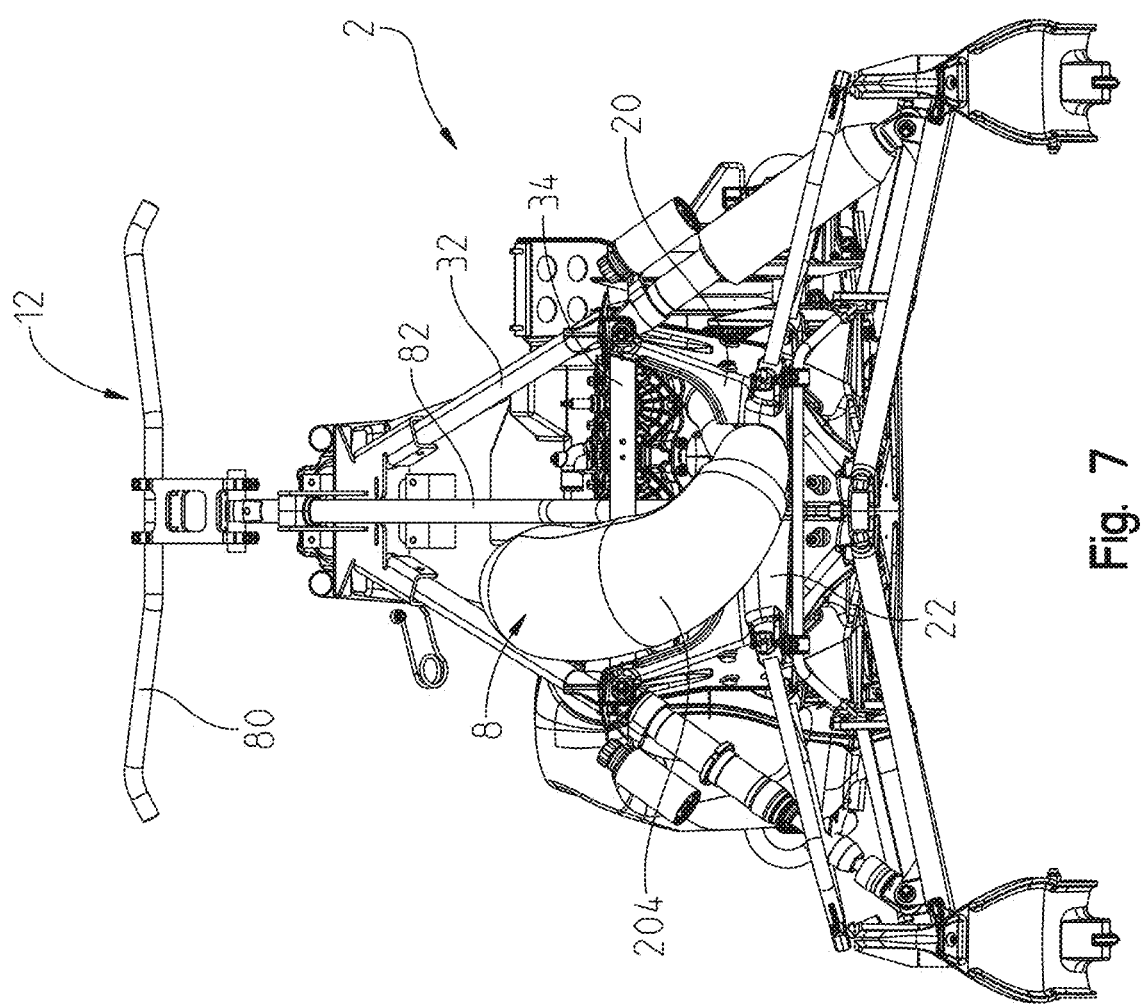
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data or residue information) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
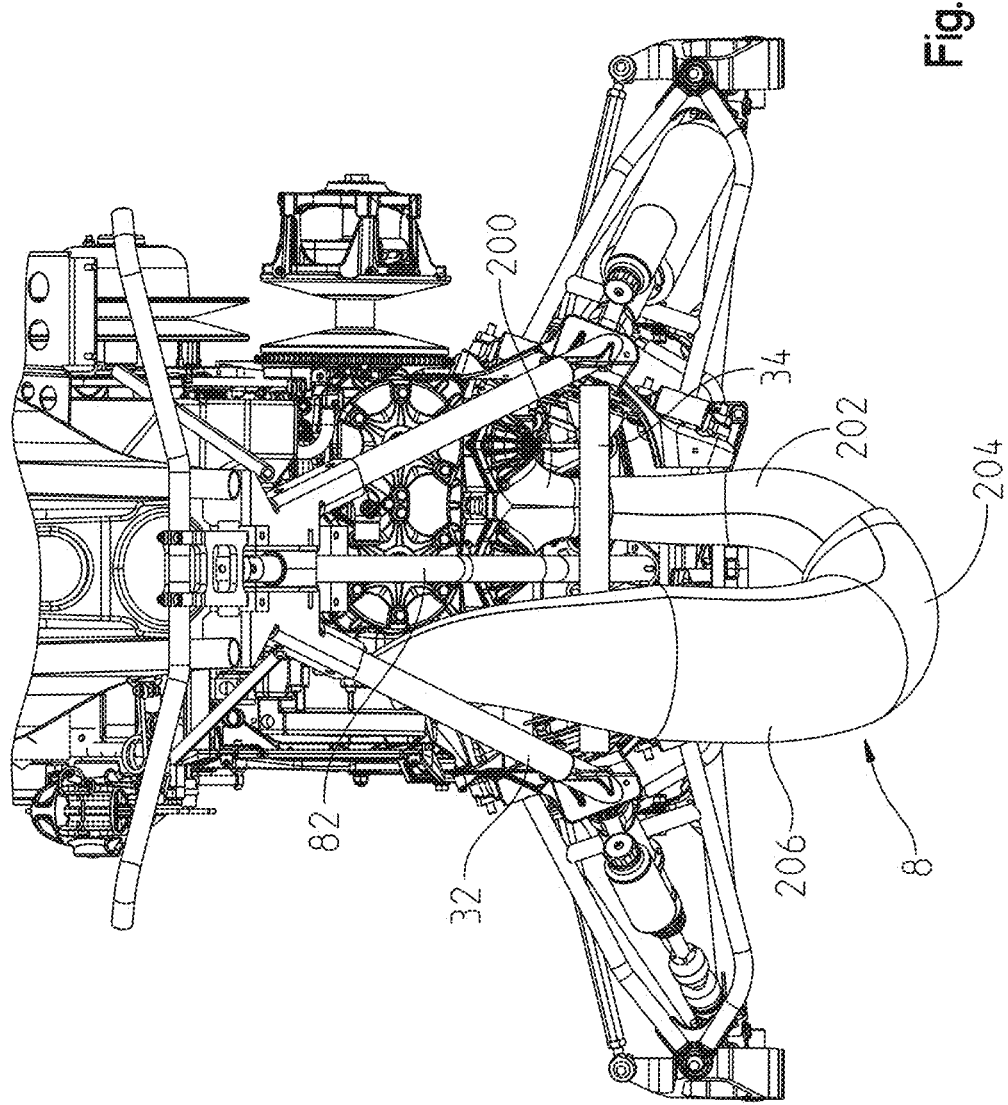
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure provide intra prediction improvement techniques for intra sub-partition (ISP).

Generally, a picture is partitioned into a plurality of blocks for encoding and decoding. In some examples, according to the HEVC standard, a picture can be split into a plurality of coding tree units (CTUs). Further, a CTU may be partitioned into coding units (CUs) by using a quad-tree (QT) structure denoted as a coding tree in order to adapt to various local characteristics of the picture. Each CU corresponds to a leaf of the quad-tree structure. The decision whether to code a picture area using an inter-picture prediction (also referred to as a temporal prediction or an inter-prediction type), an intra-picture prediction (also referred to as a spatial prediction, or an intra-prediction type), and the like is made at the CU level. Each CU can be further split into one, two or four prediction units (PUs) according to a PU splitting type which has its root at the CU level. For each PU, the same prediction process is applied and the relevant prediction information is transmitted to a decoder on a PU basis. After obtaining prediction residual data (also referred to as residue information) by applying the prediction process based on the PU splitting type, the CU can be partitioned into transform units (TUs) according to another QT structure which has its root at the CU level. According to HEVC standard, in some examples, the partition conceptions include CU, PU, and TU. In some examples, a CU, a PU that is associated with the CU, and a TU that is associated with the CU may have different block sizes. In addition, a CU or a TU has to be in a square shape in the QT structure, while a PU can have a square or a rectangular shape.

It is noted that, in some implementation examples, encoding/decoding are performed on blocks. For example, a coding tree block (CTB), a coding block (CB), a prediction block (PB), and a transform block (TB) can be used to specify, for example, 2D sample arrays of one color component associated with a corresponding CTU, CU, PU, and TU, respectively. For example, a CTU can include one luma CTB and two chroma CTBs, a CU can include one luma CB and two chroma CBS.

In order to outperform HEVC in compression capability, many other partition structures have been proposed for next generation video coding standard beyond HEVC, i.e., so-called Versatile Video Coding (VVC). One of these proposed partition structures is called QTBT structure which employs both quad-tree (QT) and binary-tree (BT). Compared to the QT structure in HEVC, the QTBT structure in VVC removes separation among the CU, PU and TU concepts. In other words, the CU, the PU that is associated with the CU, and the TU that is associated with the CU can have same block size in the QTBT structure in VVC. In addition, the QTBT structure supports more flexibility for CU partition shapes. A CU can have a square shape or a rectangle shape in the QTBT structure.

In some examples, the QTBT partitioning scheme defines certain parameters, such as CTU size, MinQTSize, MaxBTsize, MaxBTDepth, MinBTSize, and the like. CTU size is the root node size of a quad-tree, the same concept as in HEVC. MinQTSize is the minimum allowed quad-tree leaf node size. MaxBTSize is the maximum allowed binary tree root node size. MaxBTDepth is the maximum allowed binary tree depth. MinBTSize is the minimum allowed binary tree leaf node size.

In an example of a QTBT partitioning structure, the CTU size is set as 128×128 luma samples with two corresponding 64×64 blocks of chroma samples, the MinQTSize is set as 16×16, the MaxBTSize is set as 64×64, the MinBTSize (for both width and height) is set as 4×4, and the MaxBTDepth is set as 4. The quad-tree partitioning is applied to the CTU first to generate quad-tree leaf nodes. The quad-tree leaf nodes may have a size from 16×16 (i.e., the MinQTSize) to 128×128 (i.e., the CTU size). If the leaf quad-tree node is 128×128, it will not be further split by the binary tree since the size exceeds the MaxBTSize (i.e., 64×64). Otherwise, the leaf quad-tree node could be further partitioned by the binary tree. Therefore, the quad-tree leaf node is also the root node for the binary tree and it has the binary tree depth as 0. When the binary tree depth reaches MaxBTDepth (i.e., 4), no further splitting is considered. When the binary tree node has width equal to MinBTSize (i.e., 4), no further horizontal splitting is considered. Similarly, when the binary tree node has height equal to MinBTSize, no further vertical splitting is considered. The leaf nodes of the binary tree are further processed by prediction and transform processing without any further partitioning. In the JEM, the maximum CTU size is 256×256 luma samples.

Figure 9:
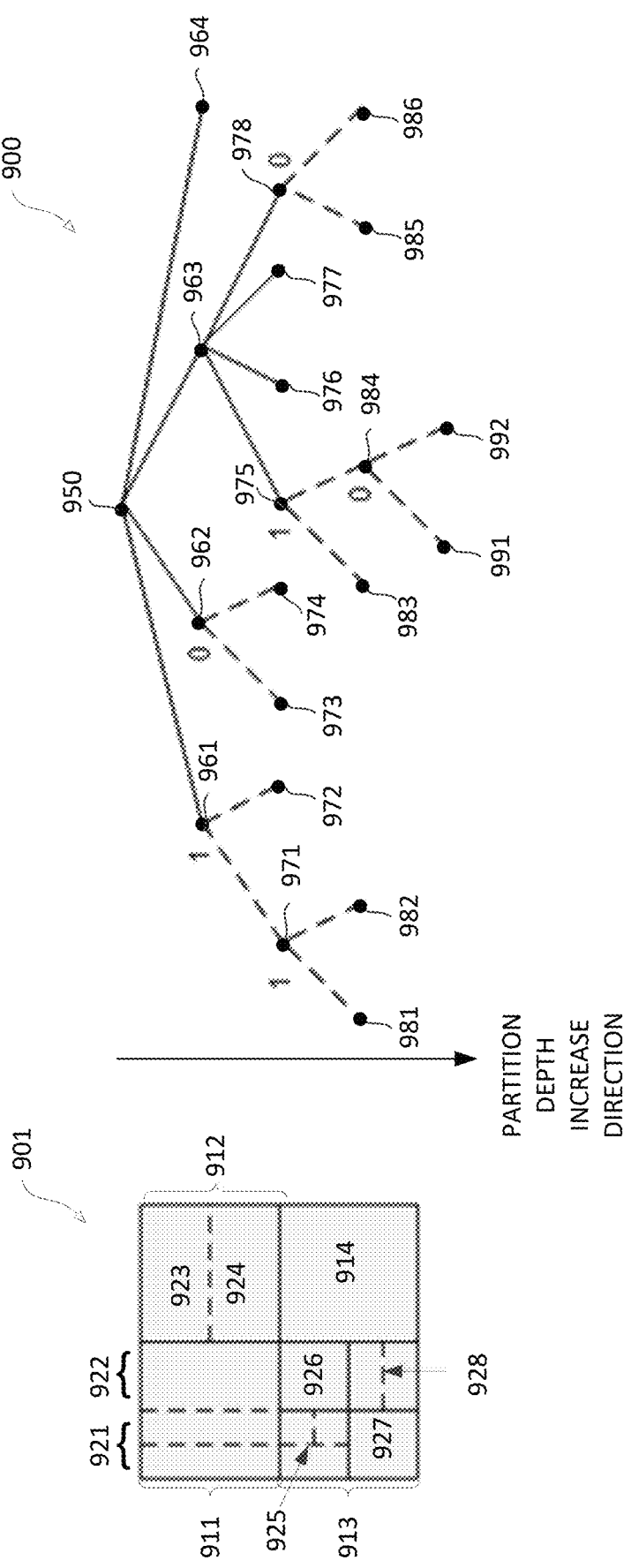
FIG. 9 illustrates an example of a partition structure in accordance with an embodiment.

FIG. 9 illustrates an example of a block (901) that is partitioned using a QTBT structure (900). In the FIG. 9 example, QT splits are represented by solid lines and BT splits are represented by dotted lines. Specifically, the QTBT structure (900) includes nodes corresponding to various blocks during the partitions for in the block (901). When a node in the QTBT structure (900) has branches, the node is referred to as a non-leaf node, and when a node in the QTBT structure (900) has no branches, the node is referred to as a leaf node. The non-leaf node corresponds to an intermediate block that is further split, and the leaf node corresponds to a final block without further splitting. When a non-leaf node has four branches, a QT split splits a block corresponding to the non-leaf node into four smaller blocks of equal size. When a non-leaf node has two branches, a BT split splits a block corresponding to the non-leaf node into two smaller blocks of equal size. The BT split has two splitting types, a symmetric horizontal split and a symmetric vertical split. In some examples, for each non-leaf BT split node, a flag is signaled (e.g., in the coded video bitstream) to indicate a splitting type (e.g., "0" for symmetric horizontal split or "1" for symmetric vertical split to produce two smaller rectangular blocks of an equal size). For a QT split node in the QTBT structure (900), the QT split splits a block corresponding to the QT split node both horizontally and vertically to produce four smaller blocks with an equal size, and thus there is no need to indicate the splitting type for QT split.

Specifically, in the FIG. 9 example, the QTBT structure (900) includes a root node (950) corresponding to the block (901). The root node (950) has four branches that respectively generate nodes (961)-(964), thus the block (901) is split by a QT split into four blocks (911)-(914) of equal sizes. The nodes (961)-(964) respectively correspond to four blocks (911)-(914).

Further, the node (961) has two branches that generate nodes (971) and (972), the node (962) has two branches that generate nodes (973) and (974), and the node (963) has four branches that generate nodes (975)-(978). It is noted that the node (964) has no branch, and thus is a leaf node. It is also noted that the node (962) is a non-leaf BT split node with a splitting type "1", and the node (963) is a non-leaf BT split node with a splitting type "0". Accordingly, the block (911) is split by a BT split vertically into two blocks (921)-(922), and the block (912) is split by a BT split horizontally into two blocks (923)-(924), and the block (913) is split by a QT split into four blocks (925)-(928).

Similarly, the node (971) has two branches that generate nodes (981)-(982), the node (975) has two branches that generate nodes (983)-(984) with a split type flag indicating vertical split (e.g., split type "1"). Likewise, the node (978) has two branches that generate nodes (985)-(986) with a split type flag indicating horizontal split (e.g., split type "0"). The node (984) has two branches that generate nodes (991)-(992) with a split type flag indicating horizontal split (e.g., split type "0"). Accordingly, the corresponding blocks (921), (928), and the right half of (925) are split into smaller blocks as shown in FIG. 9. Then nodes (981), (982), (972), (973), (974), (983), (991), (992), (976), (977), (985) and (986) are similar to the node (964) that has no branches, and are thus leaf nodes.

In the FIG. 9 example, the blocks corresponding to the leaf nodes (964), (981), (982), (972), (973), (974), (983), (991), (992), (976), (977), (985) and (986) are not further split, and are CUs that are used for prediction and transform processing. In some examples, such as VVC, the CUs are respectively used as PUs and TUs.

In addition, the QTBT scheme supports the flexibility for the luma and chroma to have a separate QTBT structure. In some examples, for P and B slices, the luma and chroma CTBs in one CTU share the same QTBT structure. However, for I slices, the luma CTB is partitioned into CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components in some examples.

In some examples, such as in HEVC, inter prediction for small blocks is restricted to reduce the memory access of motion compensation, such that bi-prediction is not supported for 4×8 and 8×4 blocks, and inter prediction is not supported for 4×4 blocks. In some examples, such as the QTBT implemented in the JEM-7.0, these restrictions are removed.

Figure 10:
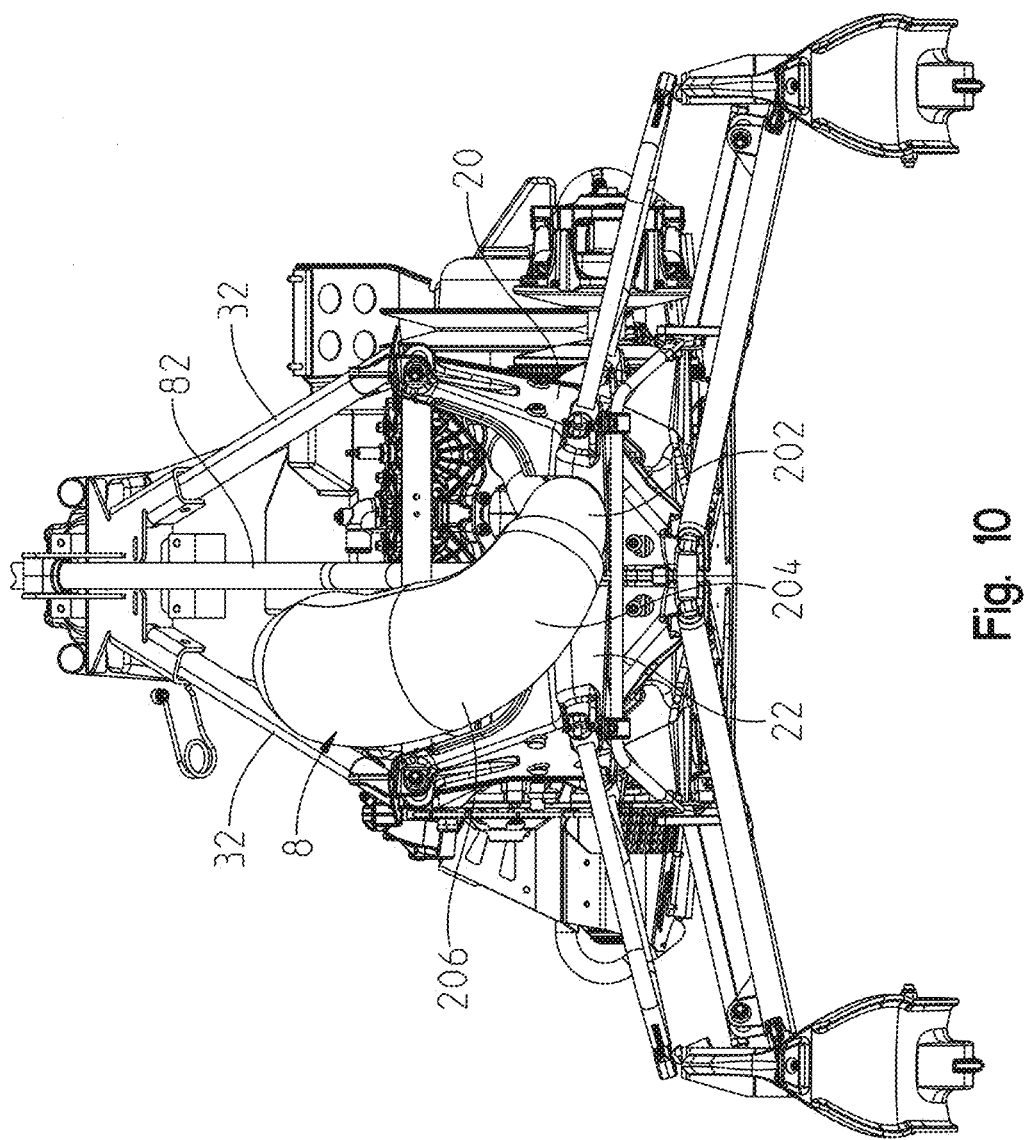
FIGS. 10A and 10B show examples of partitions according to some embodiments of the disclosure.

In addition to the QTBT structure described above, another splitting structure called multi-type-tree (MTT) structure is also used in VVC and can be more flexible than QTBT structure. In an MTT structure, other than quad-tree and binary-tree, horizontal and vertical center-side triple-tree (TT) splits are introduced, as shown in FIG. 10A and FIG. 10B. A triple-tree split can also be referred to as a triple-tree partitioning, a ternary tree (TT) split, or a ternary split. FIG. 10A shows an example of a vertical center-side TT split. For example, a block (1010) is vertically split into three sub-blocks (1011)-(1013) where the sub-block (1012) is located in the middle of the block (1010). FIG. 10B shows an example of a horizontal center-side TT split. For example, a block (1020) is horizontally split into three sub-blocks (1021)-(1023) where the sub-block (1022) is located in the middle of the block (1020). Similar to BT split, in TT split, a flag can be signaled, for example in the video bitstream from the encoder side to the decoder side, to indicate a splitting type (i.e., a symmetric horizontal split or a symmetric vertical split). In an example, "0" indicates a symmetric horizontal split and "1" indicates a symmetric vertical split.

According to an aspect of the disclosure, the triple-tree split can be complementary to quad-tree and binary-tree split. For example, triple-tree split is able to capture objects which are located in block center while quad-tree and binary-tree are always splitting along block center. Further, the width and height of the partitions of the proposed triple trees are power of 2, so that no additional transforms are needed.

Theoretically, the complexity of traversing of a tree is $T^D$, where T denotes the number of split types, and D is the depth of tree. Thus, in some example, a two-level tree is used for complexity reduction.

Figure 11:
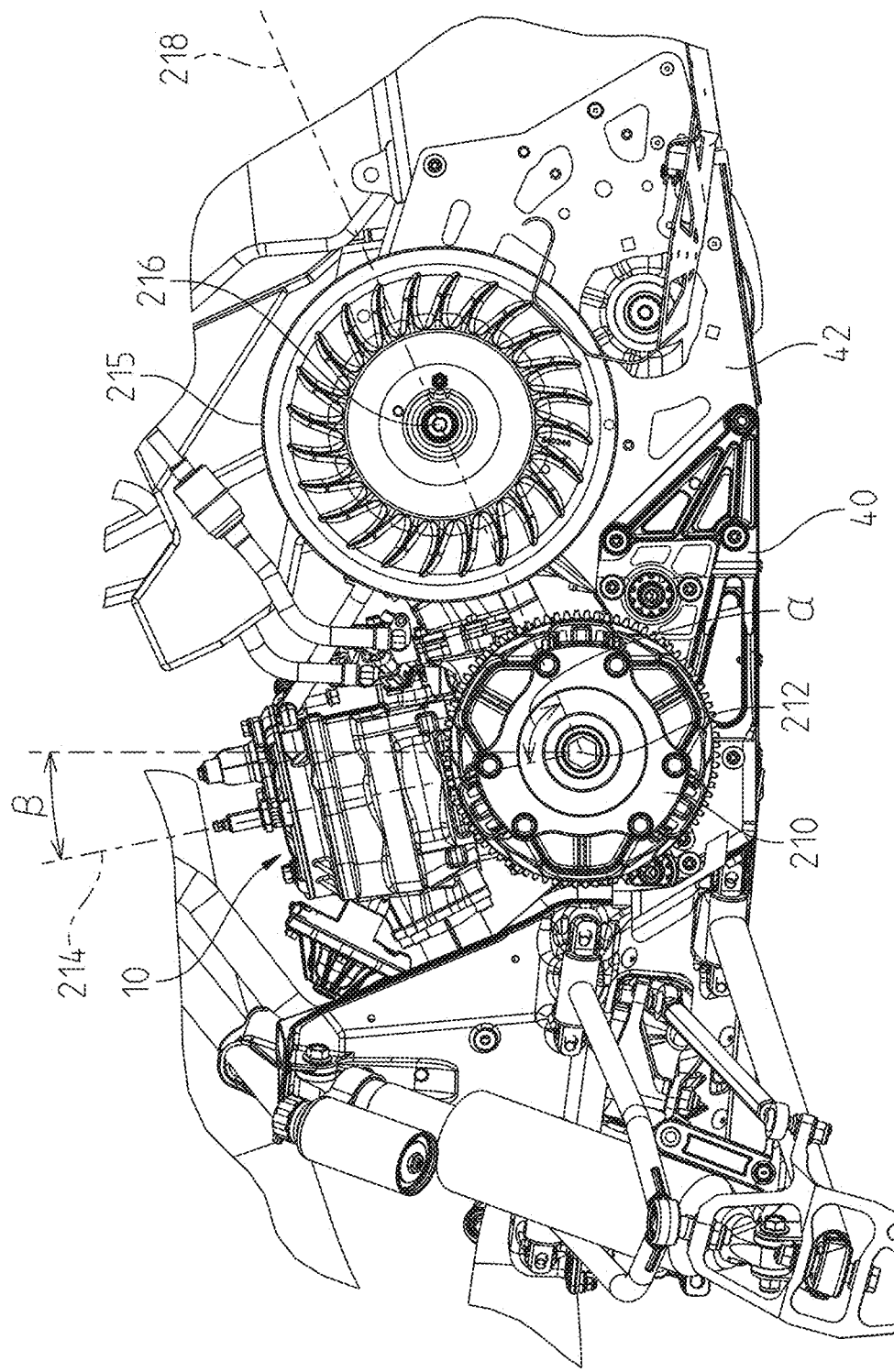
FIG. 11 shows an illustration of exemplary intra prediction directions and the intra prediction modes in some examples.

FIG. 11 shows an illustration of exemplary intra prediction directions and the intra prediction modes used in HEVC. In HEVC, there are total 35 intra prediction modes (mode 0 to mode 34). The mode 0 and mode 1 are non-directional modes, among which mode 0 is planar mode and mode 1 is DC mode. The DC mode uses an average of all samples. The planar mode uses an average of two linear predictions. The modes 2-34 are directional modes, among which mode 10 is horizontal mode, mode 26 is vertical mode, and mode 2, mode 18 and mode 34 are diagonal modes. In some examples, the intra prediction modes are signaled by three most probable modes (MPMs) and 32 remaining modes.

Figure 12:
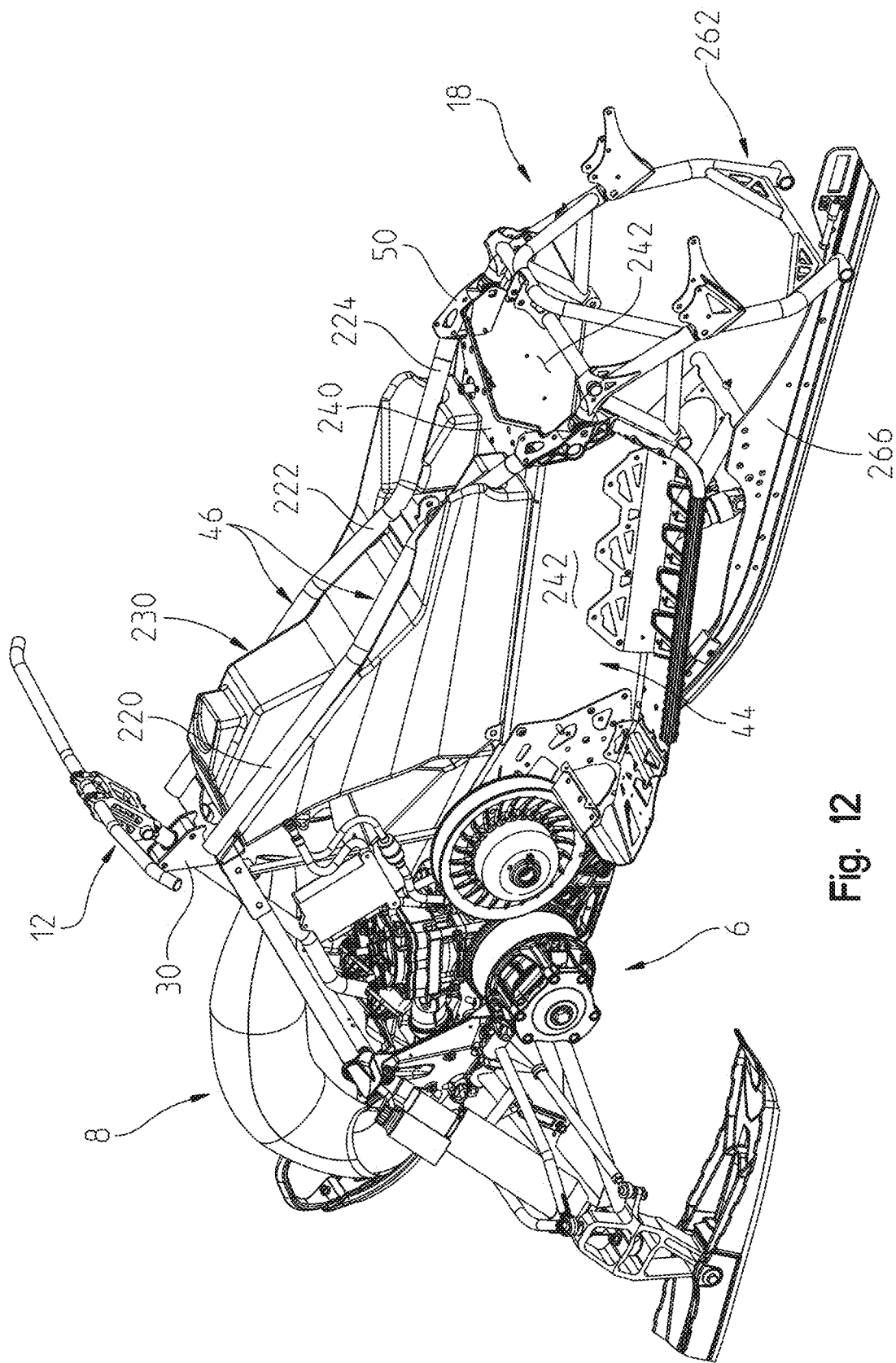
FIG. 12 shows an illustration of exemplary intra prediction directions and intra prediction modes in some examples.

FIG. 12 shows an illustration of exemplary intra prediction directions and intra prediction modes in some examples (e.g., VVC). There are total 95 intra prediction modes (mode −14 to mode 80), among which mode 18 is horizontal mode, mode 50 is vertical mode, and mode 2, mode 34 and mode 66 are diagonal modes. Modes −1~−14 and Modes 67~80 are called wide-angle intra prediction (WAIP) modes (also referred to as wide-angular modes, wide angular direction modes and the like).

Figure 13:
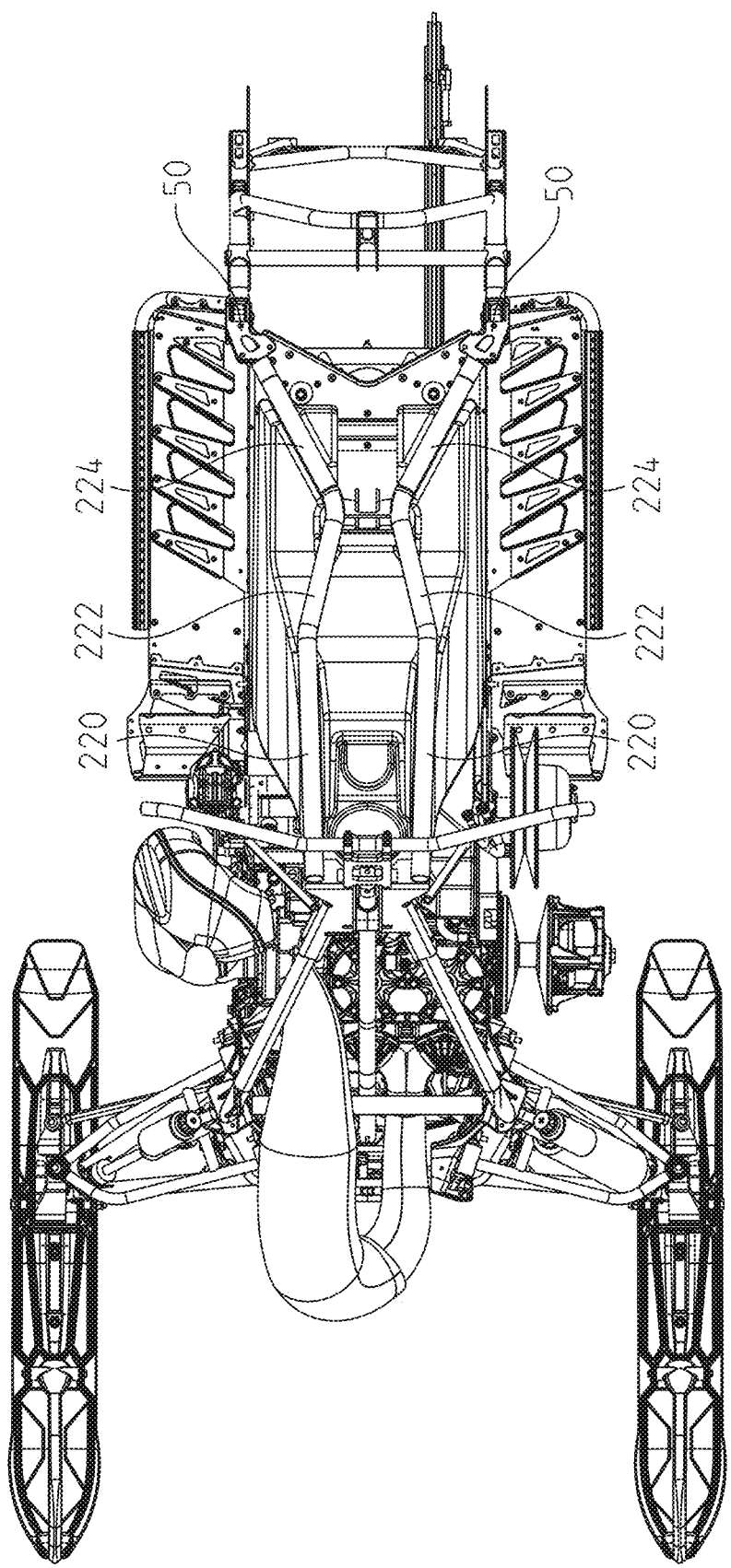
FIG. 13 shows a table of a corresponding relationship between the intra prediction modes and associated angle parameters.

FIG. 13 shows Table 1 of the corresponding relationship between the intra prediction modes and associated angle parameters. In Table 1, predModeIntra denotes the intra prediction modes and intraPredAngle denotes the intra prediction angle parameter (e.g. a displacement parameter associated with the intra prediction angle, related to tangent value of the angle) of the corresponding intra prediction modes. In the FIG. 13 example, the precision of the intra prediction angle parameters is 1/32. In some examples, when an intra prediction mode has a corresponding value X in Table 1, then the actual intraPredAngle parameter is X/32. For example, for mode 66, the corresponding value in Table 1 is 32, then the actual intraPredAngle parameter is 32/32.

It is noted that conventional angular intra prediction directions are defined from 45° to −135° in clockwise direction. In some embodiments, several conventional angular intra prediction modes are adaptively replaced with wide-angle intra prediction modes for non-square blocks. The replaced modes are signaled using the original mode indexes, which are remapped to the indexes of wide angular modes after parsing. The total number of intra prediction modes is unchanged, i.e., 67, and the intra mode coding method is unchanged.

In an example, to support prediction directions, the top references with a total width of 2 W+1 can be generated, and the left references with a total height of 2H+1 can be generated, where the width of the current block is W, and the height of the current block is H.

In some examples, the number of replaced modes for wide-angular direction modes depends on the aspect ratio of a block.

Figure 14:
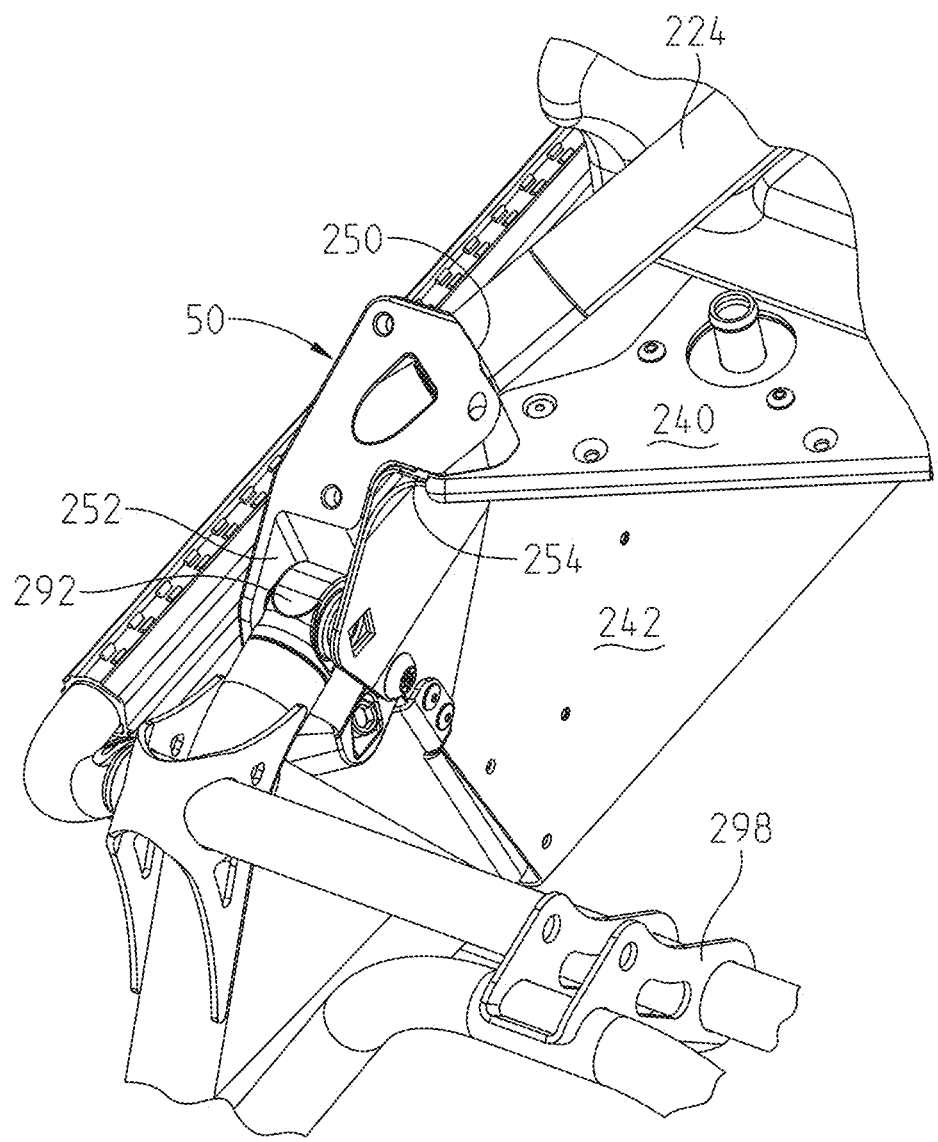
FIG. 14 shows a table for the intra prediction modes that are replaced by the wide-angle direction modes based on the aspect ratio of a block.

FIG. 14 shows a Table 2 for the intra prediction modes that are replaced by the wide-angle direction modes based on the aspect ratio of a block. In an example, for an angular mode ang_mode in Table 2, when W/H>1, the angular mode ang_mode is mapped to (65+ang_mode); and when W/H<1, the angular mode ang_mode is mapped to (ang_mode-67).

According to an aspect of the disclosure, intra sub-partition (ISP) coding mode can be used. In the ISP coding mode, a luma intra-predicted block is divided vertically or horizontally into 2 or 4 sub-partitions depending on the block sizes.

Figure 15:
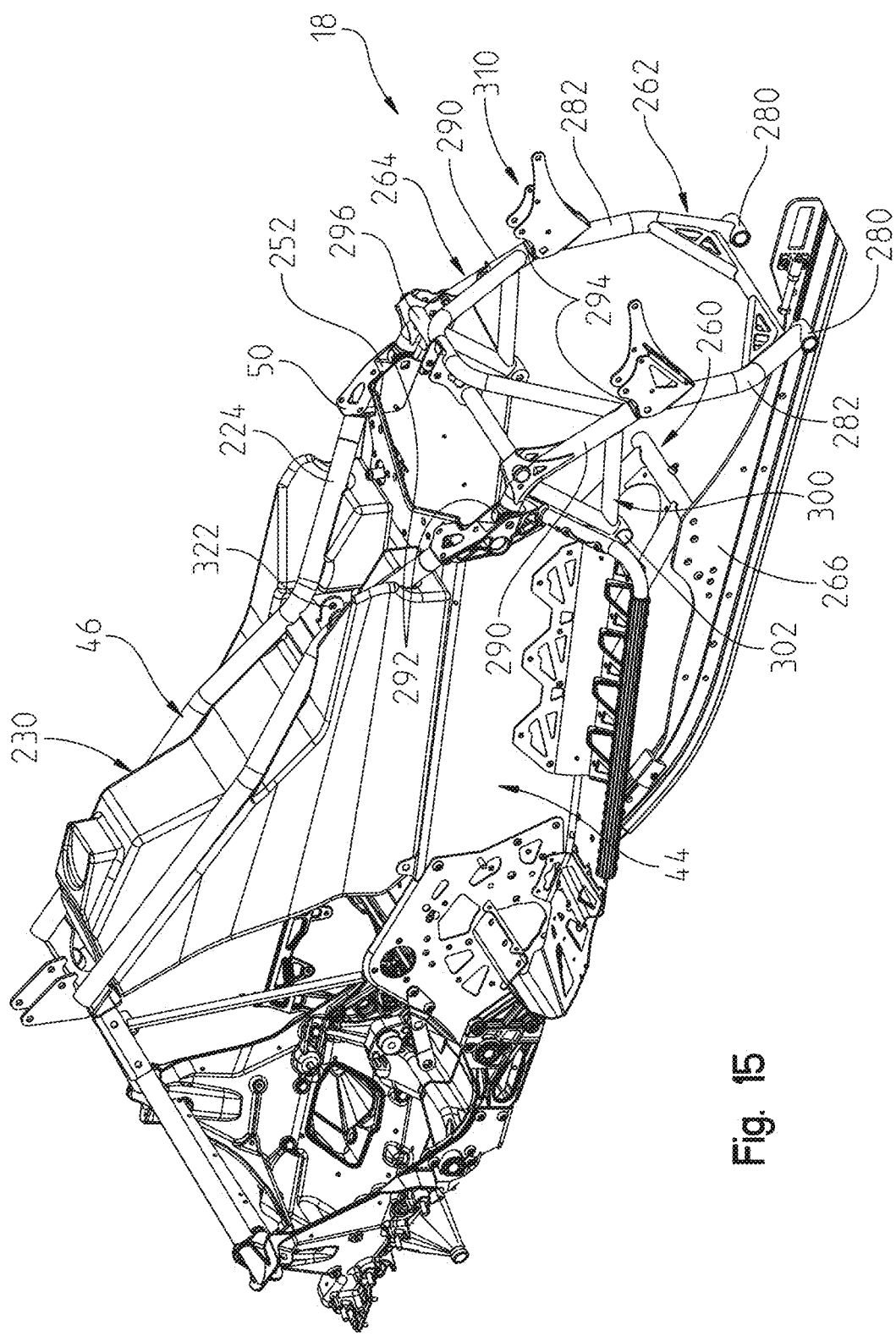
FIG. 15 shows a table that associates the number of sub-partitions with block size.

FIG. 15 shows a Table 3 that associates the number of sub-partitions with block size. For example, when the block size is 4×4, no partition is performed on the block in the ISP coding mode. When the block size is 4×8 or 8×4, then the block is partitioned into two sub-partitions in the ISP coding mode. For all other block sizes, the block is partitioned into four sub-partitions.

Figure 16:
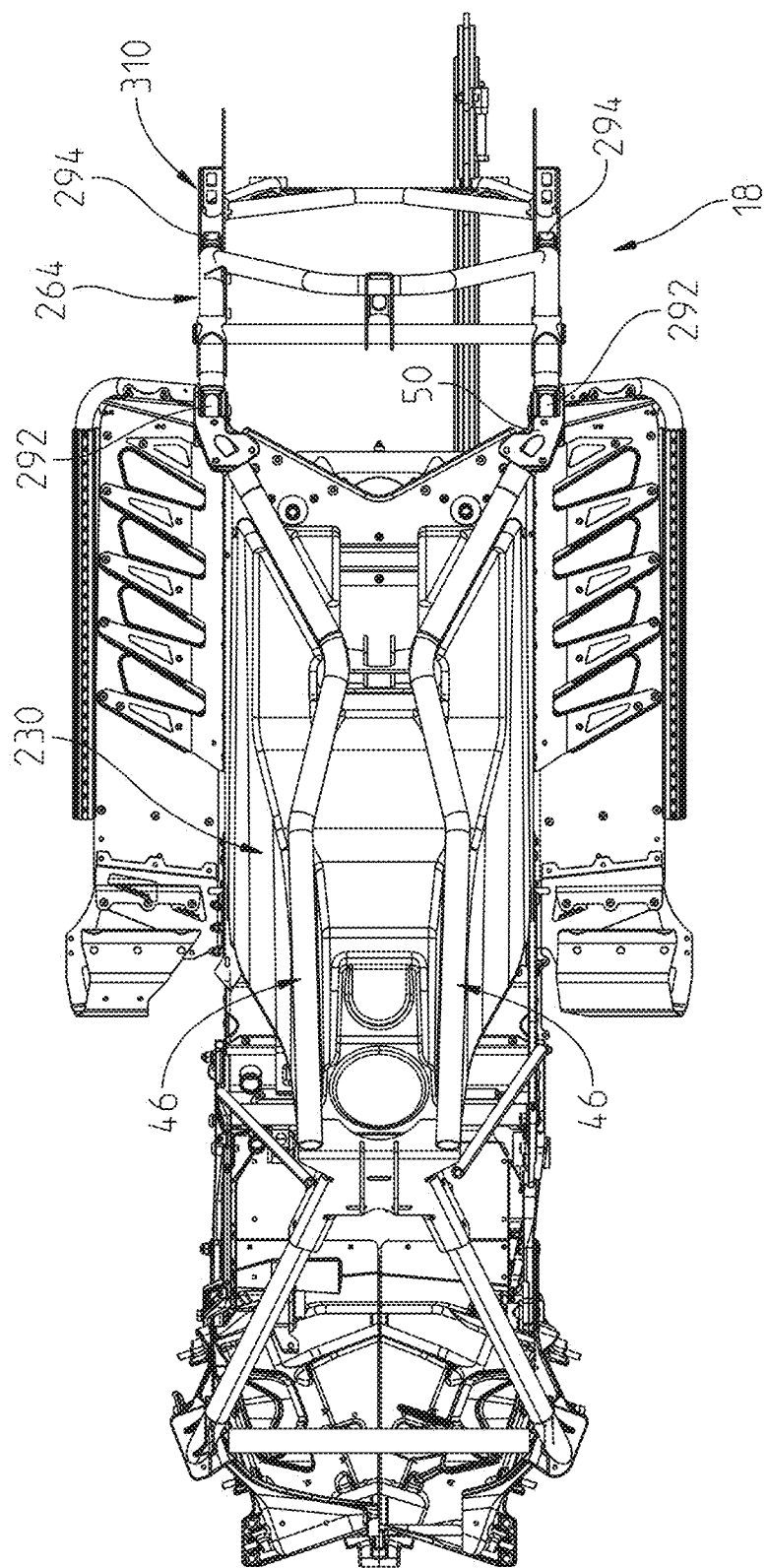
FIG. 16 shows an example of sub-partitions of a block.

FIG. 16 shows an example of sub-partitions of a block having a size 4×8 or 8×4. In an example horizontal partition, the block is partitioned into two equal sub-partitions each having a size of width×(height/2). In an example vertical partition, the block is partitioned into two equal sub-partitions each having a size of (width/2)×height.

Figure 17:
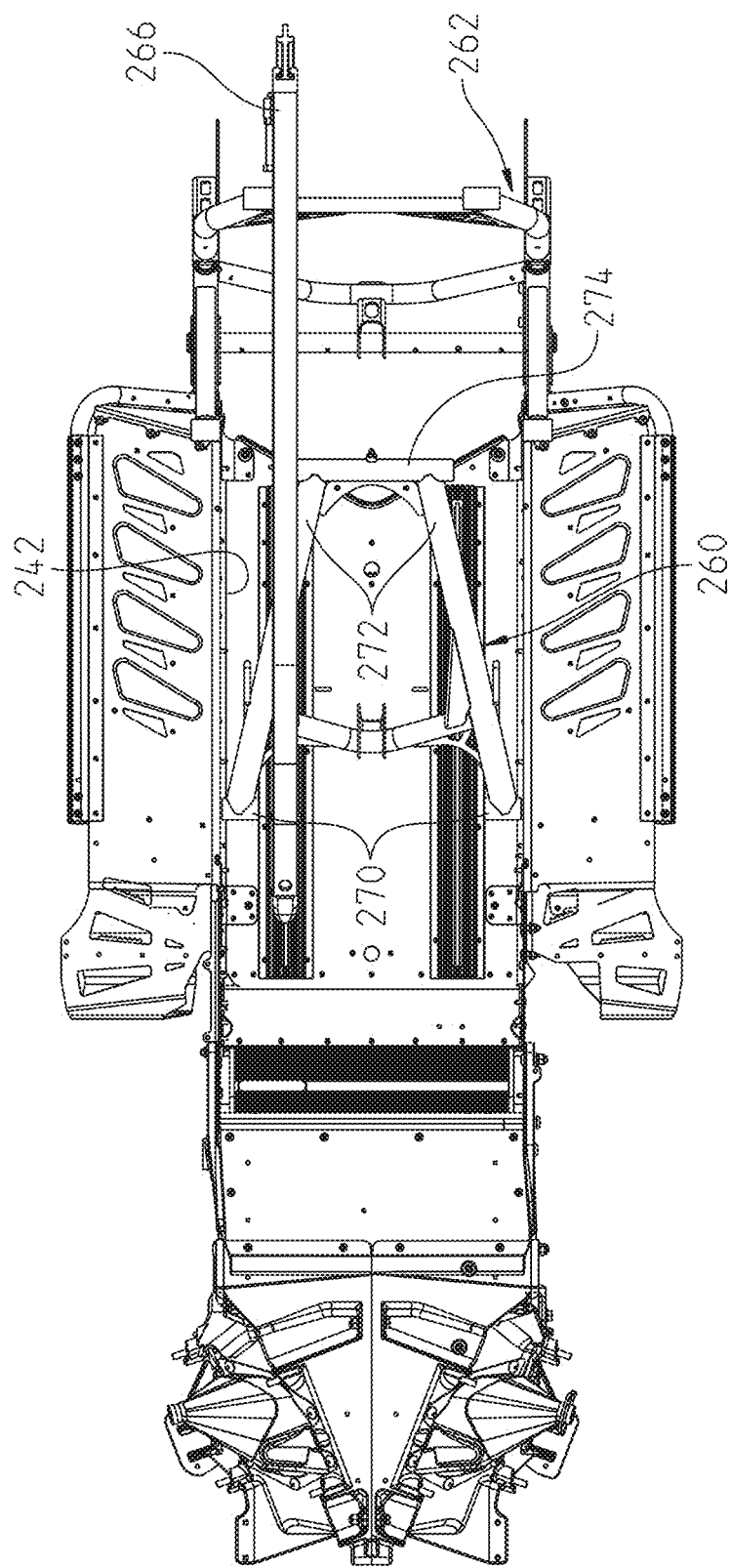
FIG. 17 shows another example of sub-partitions of a block.

FIG. 17 shows another example of sub-partitions of a block having a size other than 4×8, 8×4 and 4×4. In an example horizontal partition, the block is partitioned into four equal sub-partitions each having a size of width×(height/4). In an example vertical partition, the block is partitioned into four equal sub-partitions each having a size of (width/4)×height. In an example, all of the sub-partitions satisfy a condition of having at least 16 samples. For chroma components, ISP is not applied.

In some examples, each of the sub-partitions is regarded as a TU. For example, for each of the sub-partitions, the decoder can entropy decode coefficients that are send from the encoder to the decoder, then the decoder inverse quantizes and inverse transforms the coefficients to generate residuals for the sub-partition. Further, when the sub-partition is intra predicted by the decoder, the decoder can add the residuals with the intra prediction results to obtain the reconstructed samples of the sub-partition. Therefore, the reconstructed samples of each sub-partition can be available to generate the prediction of the next sub-partitions, which will repeat the process and so on. All sub-partitions share the same intra prediction mode in an example.

In some examples, the ISP algorithm is only tested with intra prediction modes that are part of the MPM list. For this reason, when a block uses ISP, then the MPM flag can be inferred to be set. Besides, when ISP is used for a certain block, then the MPM list can be modified to exclude the DC mode and to prioritize horizontal intra prediction modes for the ISP horizontal split and vertical intra prediction modes for the vertical split in some examples.

In some examples, in ISP, each sub-partition can be regarded as a TU, since the transform and reconstruction is performed individually for each sub-partition.

In a related ISP algorithm design, when ISP mode is on, the wide angular mode mapping process is performed at the CU level; and when ISP mode is off, the wide angular mode mapping process is performed at the TU level, which is not a unified design.

Also in the related ISP implementation, when the current CU is horizontally split, the top-right neighboring samples are marked as unavailable for the $2^{nd}$, $3^{rd}$, and $4^{th}$ partitions. When current CU is vertically split, the bottom-left neighboring samples are marked as unavailable for the $2^{nd}$, $3^{rd}$, and $4^{th}$ partitions, which may not be a desirable design.

Aspects of the disclosure provide improvement intra prediction techniques for intra sub-partition (ISP) coding mode. The proposed methods may be used separately or combined in any order. Further, each of the methods (or embodiments), encoder, and decoder may be implemented by processing circuitry (e.g., one or more processors or one or more integrated circuits). In one example, the one or more processors execute a program that is stored in a non-transitory computer-readable medium.

In the present disclosure, when an intra prediction mode is not one of Planar mode and DC mode, and the intra prediction mode generates prediction samples according to a given prediction direction, such as intra prediction mode 2-66 as defined in VVC draft 2, the intra prediction mode is referred to as an angular mode. When an intra prediction mode is not a directional intra prediction, for example, the intra prediction mode is one of Planar mode and DC mode, the intra prediction mode is referred to as a non-angular mode in the present disclosure. Each intra prediction mode is associated with a mode number (also called intra prediction mode index). For example, in a VVC working draft, Planar, DC, horizontal and vertical intra prediction modes are associated with mode number 0, 1, 18 and 50, respectively.

In the present disclosure, the vertical prediction direction is assumed using a prediction angle v, then a vertical-like intra prediction direction is defined as an intra prediction direction which is associated with a prediction angle that falls into the range of (v−thr, v+thr), where thr is a given threshold. Further, the horizontal prediction direction is assumed using prediction angle h, the horizontal-like intra prediction direction is defined as an intra prediction direction which is associated with a prediction angle that falls into (h−thr, h+thr), where thr is a given threshold.

In the present disclosure, the reference line indexes are used to refer reference lines. The adjacent reference line to the current block, which is the reference line closest to the current block, is referred to using reference line index 0.

According to an aspect of the disclosure, the wide angular mapping process, i.e., decision on whether wide angular intra prediction angles are applied or not, is performed at the TU level regardless that current CU has multiple TUs (or partitions) or not.

In an embodiment, a first set of intra prediction modes, such as modes 0-66 in VCC, is used for a block with a square shape. When the block has a non-square shape, a subset of the intra prediction modes in the first set is replaced by wide angular intra prediction modes. In some examples, the number of replaced intra prediction modes from the first set to the second set is a function of the aspect ratio of the block. However, when the aspect ratio is out of a range, the number of replaced intra prediction modes from the first set to the second set is clipped to a predefined value in an example. In some examples, the number of replaced intra prediction modes is set equal to K when the aspect ratio of a block is larger than Thres1 or smaller than Thres2 so that wide angular mapping process still works for blocks with above mentioned aspect ratio. The aspect ratio may refer to either width/height or height/width, or max (width/height, height/width), or a function of width/height and/or height/width.

In an embodiment, K is a positive integer. In an example, K is set equal to 15. In another example, K is set equal to 16.

In another embodiment, the replaced intra modes for a block with an aspect ratio larger than Thres1 or smaller than Thres2 can be determined according to a pre-defined table.

Figure 18:
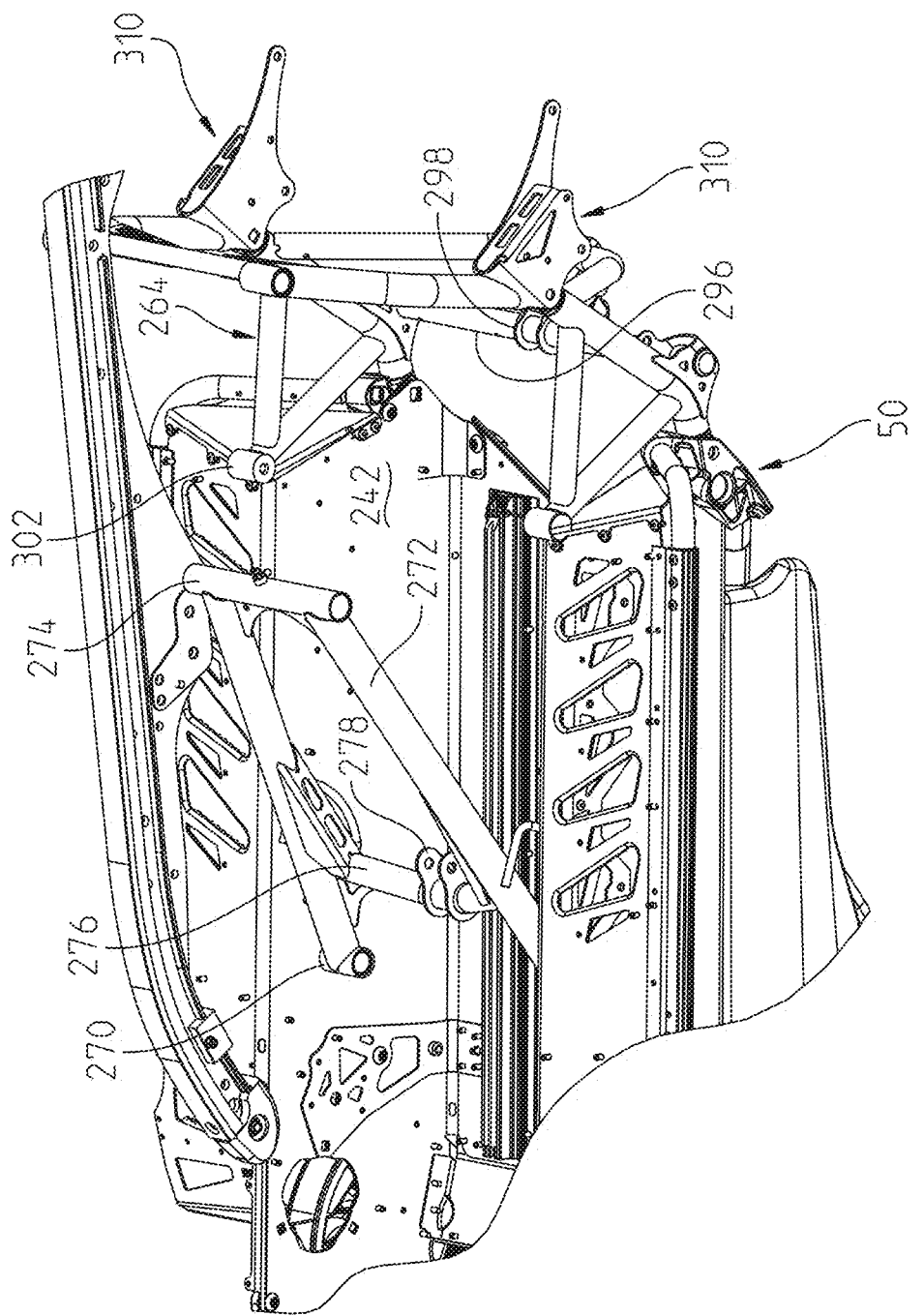
FIG. 18 shows a table that is used as an example to replace intra prediction modes with wide-angular modes.

FIG. 18 shows Table 4 that is used as an example to replace intra prediction modes with wide-angular modes. The number of replaced intra prediction modes is 15.

Figure 19:
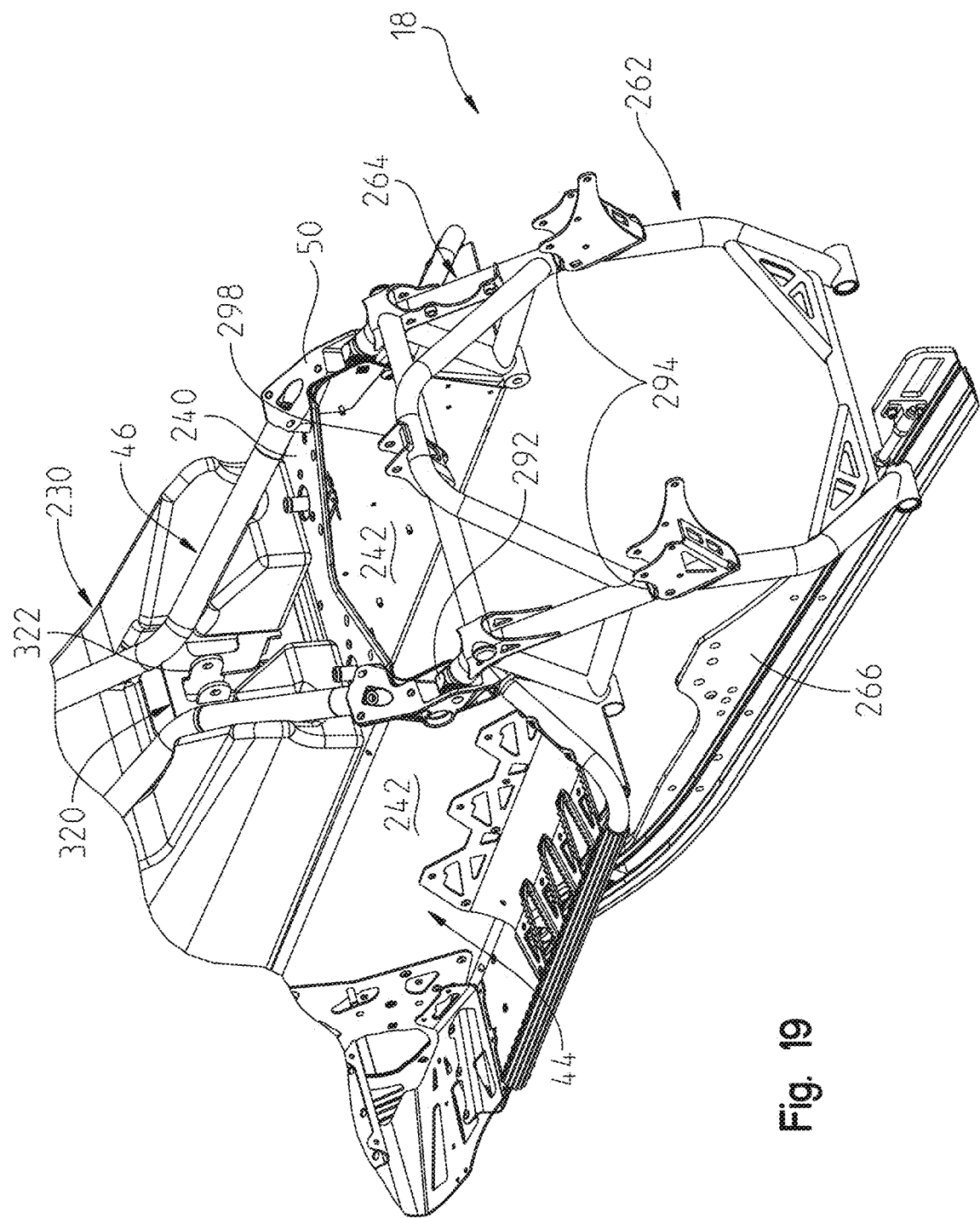
FIG. 19 shows a table that is used as another example to replace intra prediction modes with wide-angular modes.

FIG. 19 shows Table 5 that is used as another example to replace intra prediction modes with wide-angular modes. The number of replaced intra prediction modes is 16.

In another embodiment, the upper threshold Thres1 is set equal to 16 and the lower threshold Thres2 is set equal to 1/16.

In another embodiment, the upper threshold Thres1 is set equal to 32 and the lower threshold Thres2 is set equal to 1/32.

In another embodiment, when the aspect ratio of current block is larger than L1 (W/H>L1), the top reference samples with length 2 W+1, and the left reference samples with length 4H+1 are fetched, stored and for use in intra prediction. L1 is a positive integer. In an example, L1 is set equal to 16 or 32

In another embodiment, when the aspect ratio of current block is smaller than L2 (W/H<L2), the top reference samples with length 4 W+1, and the left reference samples with length 2H+1 are fetched, stored and for use in intra prediction. L2 is a positive number. In one example, L2 is set equal to 1/16 or 1/32.

In another embodiment, the precision of intra prediction directions are changed to 1/64, and intra prediction directions with tan (α) equal to 1/64, 2/64, 4/64, 8/64, 16/64, 32/64, 64/64 are included. In some examples, the number of replaced modes with wide angular modes for blocks with aspect ratio equal to 16 (1/16), 32 (1/32), 64 (1/64) is set equal to 13, 14, and 15 respectively. For example, the number of replaced modes with wide angular modes for blocks with aspect ratio equal to 16 (1/16) is set equal to 13. For example, the number of replaced modes with wide angular modes for blocks with aspect ratio equal to 32 (1/32) is set equal to 14. For example, the number of replaced modes with wide angular modes for blocks with aspect ratio equal to 64 (1/64) is set equal to 15.

According to another aspect of the disclosure, when ISP mode is on, the neighboring samples of the first sub-partition can also be used for the 2nd, 3rd, and 4th partition.

In an embodiment, when current CU is vertically split, the bottom left neighboring samples used for the intra prediction of the first sub-partition can also be used as the bottom left neighboring samples for the $2^{nd}$, $3^{rd}$, and $4^{th}$ partition, and the bottom left neighboring samples used for the intra prediction of $1^{st}$ partition is listed in the following picture.

Figure 20:
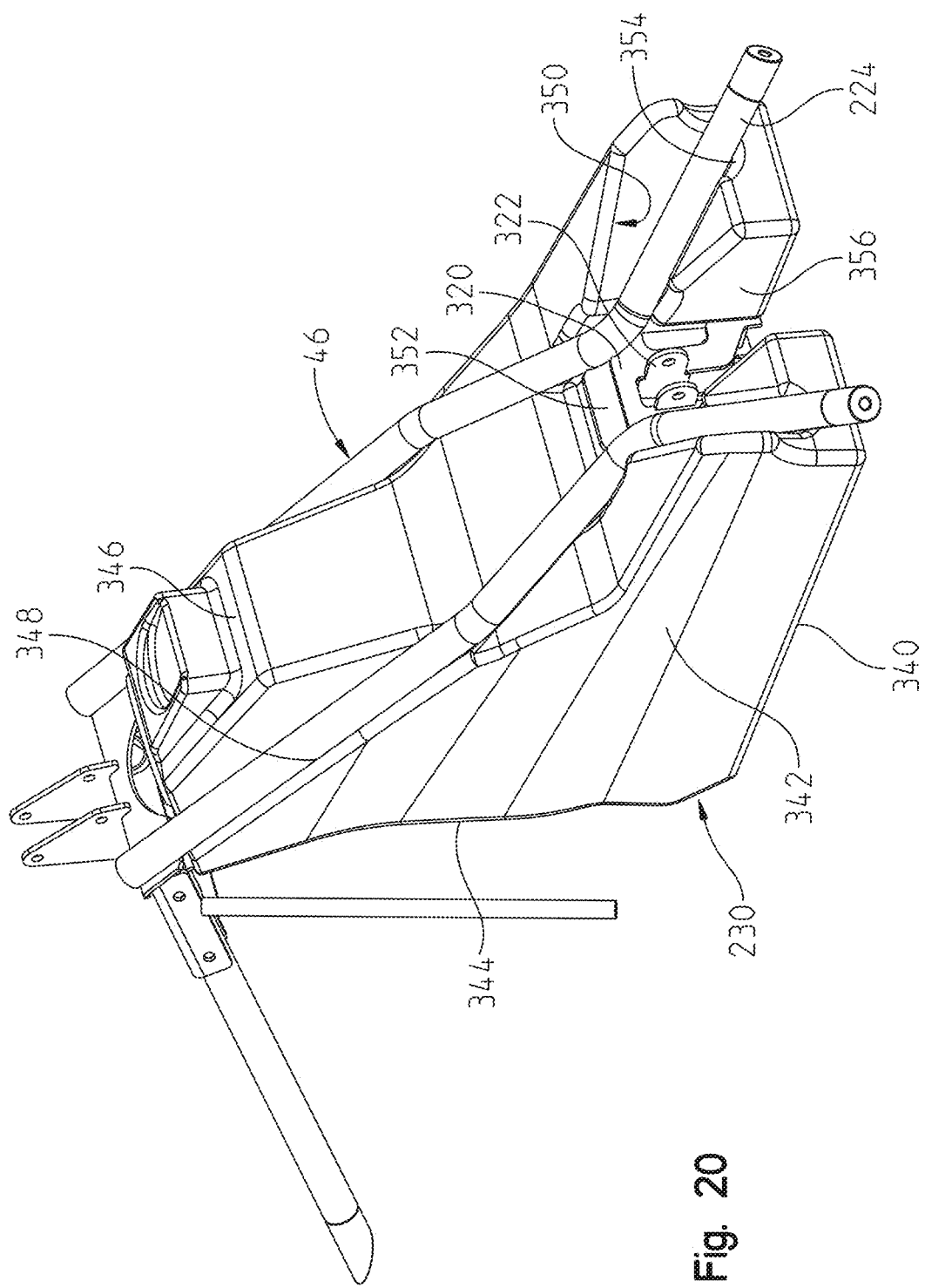
FIG. 20 shows an example of reference samples in an intra sub-partition (ISP) mode.

FIG. 20 shows an example of reference samples in ISP mode. In the FIG. 20 example, a CU 2010 is vertically split into a first sub-partition, a second sub-partition, a third sub-partition and a fourth sub-partition. The neighboring samples for the CU 2010 includes top neighboring samples 2020, top right neighboring samples 2030, left neighboring samples 2040 and bottom left neighboring samples 2050.

In an example, to intra predict the first sub-partition, the top neighboring samples, the top right neighboring samples, the left neighboring samples and the bottom left neighboring samples for the first sub-partition are available.

Further, in an example, to intra predict the second sub-partition, the bottom left neighboring samples for the second sub-partition haven't been decoded and are not available. Similarly, the bottom left neighboring samples for the third sub-partition and the fourth sub-partition are not available. In some embodiments, the bottom-left neighboring samples 2050 of the first sub-partition are used as the bottom left neighboring samples for the second sub-partition, the third sub-partition and the fourth sub-partition.

In another embodiment, when current CU is horizontally split, the top right neighboring samples used for the intra prediction of the first sub-partition can also be used as the top right neighboring samples for the $2^{nd}$, $3^{rd}$, and $4^{th}$ sub-partition, and the top right neighboring samples used for the intra prediction of the $1^{st}$ sub-partition is listed in the following picture.

Figure 21:
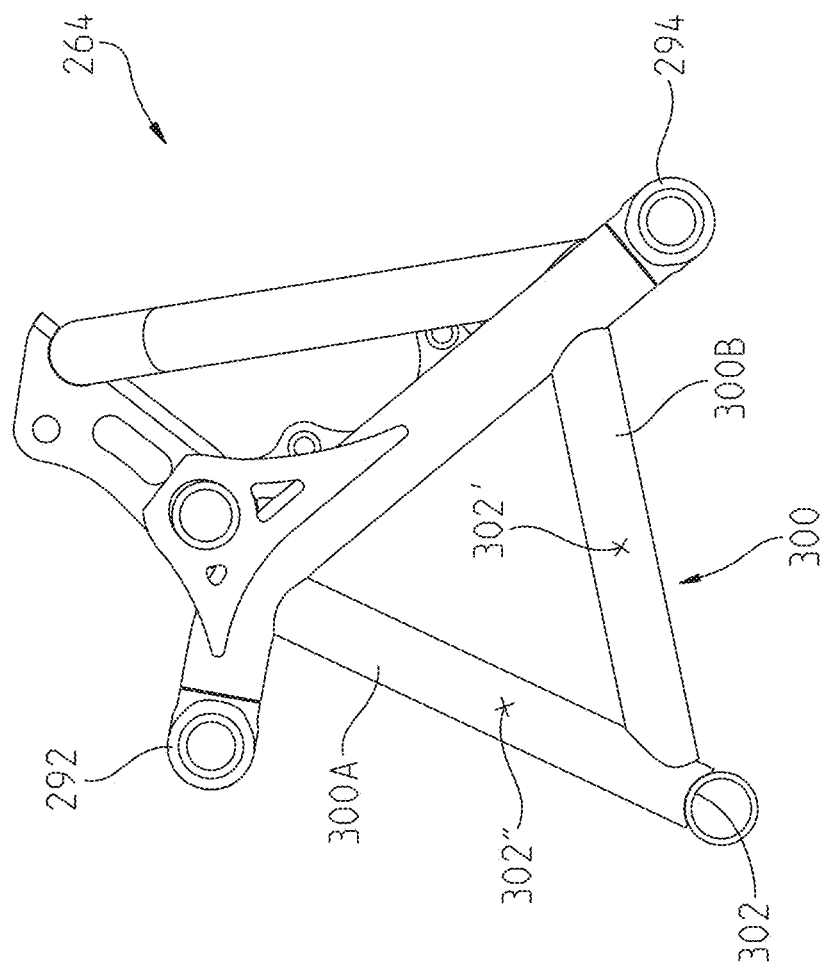
FIG. 21 shows an example of reference samples in an ISP mode.

FIG. 21 shows an example of reference samples in an ISP mode. In the FIG. 21 example, a CU 2110 is horizontally split into a first sub-partition, a second sub-partition, a third sub-partition and a fourth sub-partition. The neighboring samples for the CU 2110 includes top neighboring samples 2120, top right neighboring samples 2130, left neighboring samples 2140 and bottom left neighboring samples 2150.

In an example, to intra predict the first sub-partition, the top neighboring samples, the top right neighboring samples, the left neighboring samples and the bottom left neighboring samples for the first sub-partition are available.

Further, in an example, to intra predict the second sub-partition, the top-right neighboring samples for the second sub-partition haven't been decoded and are not available. Similarly, the top right neighboring samples for the third sub-partition and the fourth sub-partition are not available. In some embodiments, the top right neighboring samples 2130 of the first sub-partition are used as the top right neighboring samples for the second sub-partition, the third sub-partition and the fourth sub-partition.

In another embodiment, when current CU is horizontally split, for planar intra prediction, the top right sample of the first sub-partition is also denoted as the top right sample of the 2nd, 3rd, 4th sub-partition of current CU.

In some examples, when the size of current CU is N×4 or N×8, N can be any positive integer such as 2, 4, 8, 16, 32, 64, 128, and current CU is horizontally split, the top right sample of the first sub-partition is also denoted as the top-right sample of the 2nd, 3rd, 4th sub-partition of current CU.

Figure 22:
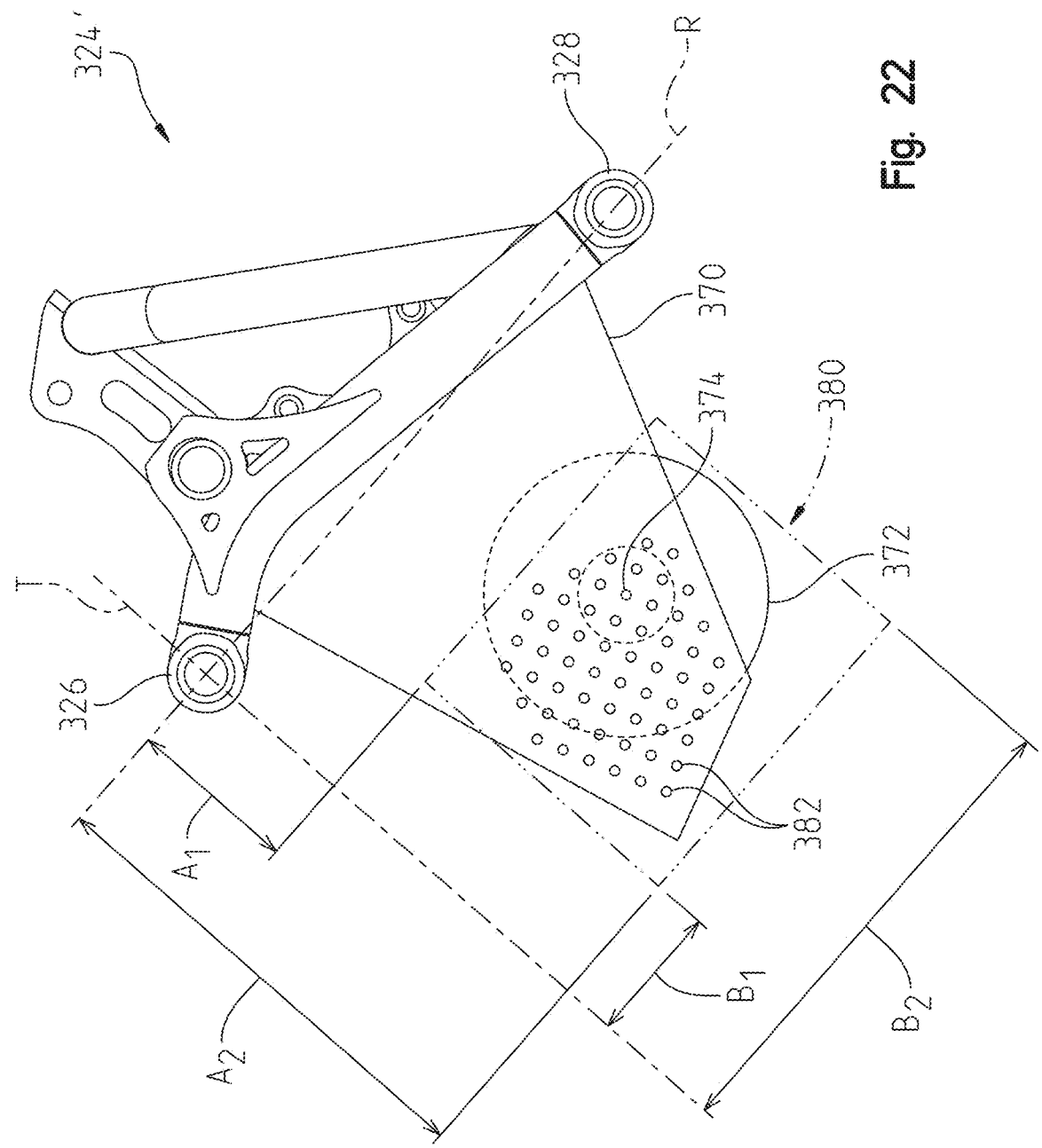
FIG. 22 shows an example of reference samples in an ISP mode for a planar mode prediction.

FIG. 22 shows an example of reference samples in an ISP mode for a planar mode prediction. In the FIG. 22 example, a CU 2210 is horizontally split into a first sub-partition, a second sub-partition, a third sub-partition and a fourth sub-partition. The neighboring samples used in planar mode prediction for the CU 2210 includes top neighboring samples 2220, a top right neighboring sample 2230, left neighboring samples 2240 and a bottom left neighboring sample 2250.

In an example, to intra predict the first sub-partition in planar mode, the top neighboring samples, the top right neighboring sample, the left neighboring samples and the bottom left neighboring sample for the first sub-partition are available.

Further, in an example, to intra predict the second sub-partition in the planar mode, the top-right neighboring sample for the second sub-partition hasn't been decoded and is not available. Similarly, the top right neighboring sample for the third sub-partition and the top-right neighboring sample for the fourth sub-partition are not available. In some embodiments, the top right neighboring sample 2230 of the first sub-partition is used as the top right neighboring sample for the second sub-partition, the third sub-partition and the fourth sub-partition respectively.

In some examples, when the size of current CU is N×4 or N×8, N can be any positive integer such as 2, 4, 8, 16, 32, 64, 128, and current CU is horizontally split, the position of the top-right sample used for Planar prediction of the 2nd, 3rd, 4th partition of current CU can be different for different partitions.

In another embodiment, when current CU is vertically split, for planar intra prediction, the bottom left sample of the first sub-partition is also denoted as the bottom left sample of the 2nd, 3rd, 4th sub-partition of current CU.

In some examples, when the size of current CU is 4×N or 8×N, N can be any positive integer such as 2, 4, 8, 16, 32, 64, 128, and current CU is vertically split, the bottom left sample of the first sub-partition is also denoted as the bottom left sample of the 2nd, 3rd, 4th sub-partition of current CU.

FIG. 23 shows an example of reference samples in an ISP mode for planar intra prediction. In the FIG. 23 example, a CU 2310 is vertically split into a first sub-partition, a second sub-partition, a third sub-partition and a fourth sub-partition. The neighboring samples (in planar intra prediction) for the CU 2310 includes top neighboring samples 2320, top right neighboring samples 2330, left neighboring samples 2340 and bottom left neighboring samples 2350.

In an example, to intra predict the first sub-partition in the planar mode, the top neighboring samples, the top right neighboring sample, the left neighboring samples and the bottom-left neighboring sample for the first sub-partition are available.

Further, in an example, to intra predict the second sub-partition in the planar mode, the bottom-left neighboring sample for the second sub-partition hasn't been decoded and is not available. Similarly, the bottom left neighboring sample for the third sub-partition and the bottom left neighboring sample for the fourth sub-partition are not available. In some embodiments, the bottom-left neighboring sample 2350 of the first sub-partition is used as the bottom left neighboring sample for the second sub-partition, the third sub-partition and the fourth sub-partition respectively.

In some examples, when the size of current CU is 4×N or 8×N, N can be any positive integer such as 2, 4, 8, 16, 32, 64, 128, and current CU is vertically split, the position of the bottom left sample used for planar prediction of the 2nd, 3rd, 4th partition of current CU can be different for different partitions.

According to another aspect of the disclosure, the number of sub-block partitions may depend on coded information, including, but not limited to the block size of current block, neighboring block intra prediction mode. Thus, the number of sub-block partitions can be inferred and does not need explicit signaling.

In an embodiment, for N×4 or N×8 CU, N is a positive integer such as 8, 16, 32, 64, 128, current CU can only be vertically split, and one flag is signaled to indicate whether current CU is vertically split into 2 partitions or 4 partitions.

In an example, if the block size is N×4, instead of horizontally partitioning into four N×1 sub-partitions, the block is vertically partitioned into two N/2×4 partitions. In an example, if the block size is N×8, instead of horizontally partitioning into four N×2 sub-partitions, the block is vertically partitioned into two N/2×8 partitions.

In another example, if the block size is N×8, instead of horizontally partitioning into four N×2 sub-partitions, the block is horizontally partitioned into two N/2×4 partitions.

In another embodiment, for 4×N or 8×N CU, N is a positive integer such as 8, 16, 32, 64, 128, current CU can only be horizontally split, and one flag is signaled to indicate whether current CU is horizontally split into 2 partitions or 4 partitions.

In an example, if the block size is 4×N, instead of vertically partitioning into four 1×N sub-partitions, the block is horizontally partitioned into two 4×N/2 partitions. In an example, if the block size is 8×N, instead of vertically partitioning into four 2×N sub-partitions, the block is horizontally partitioned into two 8×N/2 partitions.

In another example, if the block size is 8×N, instead of vertically partitioning into four 2×N sub-partitions, the block is horizontally partitioned into two 4×N/2 partitions.

According to another aspect of the disclosure, for adjacent reference line with ISP mode disabled, adjacent reference line with ISP mode enabled, and non-adjacent reference lines, the same MPM list construction process is shared and use the same order of candidates. Planar and DC modes are always inserted into MPM list with index 0 and 1 in some examples.

In an embodiment, when reference line index is signaled as 0, for the first bin of the MPM index, 2 contexts are used. If at least one of the neighboring blocks satisfy the following conditions: 1) MPM flag is true, 2) reference line index is 0, and 3) MPM index is smaller than Th, first context is used. Otherwise, the second context is used. Th is a positive integer, such as 1, 2 or 3.

In another embodiment, when reference line index is signaled as 0, for the first bin of the MPM index, only 1 context is used.

In another embodiment, when reference line index is signaled as 0, ISP mode is off, for the second bin of the MPM index, only 1 context is used.

In another embodiment, if the above neighboring blocks are beyond the current CTU row, the above neighboring blocks will be marked as unavailable for MPM index context derivation.

In another embodiment, when reference line index is signaled as 0, the first K bins of the MPM index is dependent on the MPM flag, and/or MPM index, and/or ISP flag, and/or reference line index of its neighboring blocks. K is a positive integer, such as 1 or 2.

In an example, when adjacent reference line with index 0 is signaled, for the first bin of the MPM index, 2 contexts are used. When ISP flag of current block is on, first context is used. Otherwise, second context is used.

In another example, when adjacent reference line with index 0 is signaled, for the first bin of the MPM index, 2 contexts are used. When at least one of the ISP flag of the current block and its neighboring blocks are on, first context is used. Otherwise, second context is used.

FIG. 24 shows a flow chart outlining a process (2400) according to an embodiment of the disclosure. The process (2400) can be used in the reconstruction of a block, so to generate a prediction block for the block under reconstruction. In various embodiments, the process (2400) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2400) is implemented in software instructions, thus when the processing circuitry executes the software instructions, the processing circuitry performs the process (2400). The process starts at (S2401) and proceeds to (S2410).

At (S2410), prediction information of a current block is decoded from a coded video bitstream. The prediction information is indicative of a first intra prediction mode in a first set of intra prediction modes for intra prediction of a square-shape. In some examples, the prediction information is also indicative of residue information of sub-partitions of the current block. For example, the prediction information includes residual data of TUs.

At (S2420), the first intra prediction mode is remapped to a second intra prediction mode in a second set of intra prediction modes for intra prediction of a non-square shape based on a shape of the first sub-partition of the current block.

At (S2430), samples of the sub-partitions are reconstructed at according to the second intra prediction mode and the residue information of the sub-partitions. Then, the process proceeds to (S2499) and terminates.

FIG. 25 shows a flow chart outlining a process (2500) according to an embodiment of the disclosure. The process (2500) can be used in the reconstruction of a block, so to generate a prediction block for the block under reconstruction. In various embodiments, the process (2500) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2500) is implemented in software instructions, thus when the processing circuitry executes the software instructions, the processing circuitry performs the process (2500). The process starts at (S2501) and proceeds to (S2510).

At (S2510), prediction information of a current block is decoded from a coded video bitstream.

At (S2520), the current block is partitioned into at least a first sub-partition and a second sub-partition based on the prediction information. For example, the current block can be partitioned as shown in FIG. 16 and FIG. 17.

At (S2530), samples of the first sub-partition and the second sub-partition are reconstructed based on at least a neighboring sample of the current block that is out of a neighboring area of at least one of the first sub-partition and the second sub-partition, such as described with reference to FIGS. 20-23. Then, the process proceeds to (S2599) and terminates.

The techniques described above, can be implemented as computer software using computer-readable instructions and physically stored in one or more computer-readable media. For example, FIG. 26 shows a computer system (2600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

The components shown in FIG. 26 for computer system (2600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2600).

Computer system (2600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2601), mouse (2602), trackpad (2603), touch screen (2610), data-glove (not shown), joystick (2605), microphone (2606), scanner (2607), camera (2608).

Computer system (2600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2610), data-glove (not shown), or joystick (2605), but there can also be tactile feedback devices that do not serve as input devices), audio output devices (such as: speakers (2609), headphones (not depicted)), visual output devices (such as screens (2610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2600) can also include human accessible storage devices and their associated media such as optical media including CD/DVD ROM/RW (2620) with CD/DVD or the like media (2621), thumb-drive (2622), removable hard drive or solid state drive (2623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2649) (such as, for example USB ports of the computer system (2600)); others are commonly integrated into the core of the computer system (2600) by attachment to a system bus as described below (for example Ethernet interface into a PC computer system or cellular network interface into a smartphone computer system). Using any of these networks, computer system (2600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2640) of the computer system (2600).

The core (2640) can include one or more Central Processing Units (CPU) (2641), Graphics Processing Units (GPU) (2642), specialized programmable processing units in the form of Field Programmable Gate Areas (FPGA) (2643), hardware accelerators for certain tasks (2644), and so forth. These devices, along with Read-only memory (ROM) (2645), Random-access memory (2646), internal mass storage such as internal non-user accessible hard drives, SSDs, and the like (2647), may be connected through a system bus (2648). In some computer systems, the system bus (2648) can be accessible in the form of one or more physical plugs to enable extensions by additional CPUs, GPU, and the like. The peripheral devices can be attached either directly to the core's system bus (2648), or through a peripheral bus (2649). Architectures for a peripheral bus include PCI, USB, and the like.

CPUs (2641), GPUs (2642), FPGAs (2643), and accelerators (2644) can execute certain instructions that, in combination, can make up the aforementioned computer code. That computer code can be stored in ROM (2645) or RAM (2646). Transitional data can be also be stored in RAM (2646), whereas permanent data can be stored for example, in the internal mass storage (2647). Fast storage and retrieve to any of the memory devices can be enabled through the use of cache memory, that can be closely associated with one or more CPU (2641), GPU (2642), mass storage (2647), ROM (2645), RAM (2646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2600), and specifically the core (2640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2640) that are of non-transitory nature, such as core-internal mass storage (2647) or ROM (2645). The software implementing various embodiments of the present disclosure can be stored in such devices and executed by core (2640). A computer-readable medium can include one or more memory devices or chips, according to particular needs. The software can cause the core (2640) and specifically the processors therein (including CPU, GPU, FPGA, and the like) to execute particular processes or particular parts of particular processes described herein, including defining data structures stored in RAM (2646) and modifying such data structures according to the processes defined by the software. In addition or as an alternative, the computer system can provide functionality as a result of logic hardwired or otherwise embodied in a circuit (for example: accelerator (2644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, the method comprising:
    decoding prediction information of a first block from a coded video bitstream, the first block being a non-square block and the prediction information for the first block being indicative of a first intra prediction mode in a first set of intra prediction modes for a square block;
    when a width of the first block is greater than a height of the first block, adding a first value to a mode number associated with the first intra prediction mode to remap the first intra prediction mode to a second intra prediction mode in a second set of intra prediction modes for the non-square block, the second set of intra prediction modes not including a subset of disabled intra prediction modes that is a subset in the first set of intra prediction modes;
    when the height of the first block is greater than the width of the first block, subtracting a second value from the mode number associated with the first intra prediction mode to remap the first intra prediction mode to the second intra prediction mode;
    when an aspect ratio of the first block is out of an aspect ratio range, a number of intra prediction modes in the subset of disabled intra prediction modes is 15 or 16; and
    reconstructing the first block according to the second intra prediction mode.

2. The method of claim 1, wherein
    the aspect ratio is one of (i) height/width, (ii) width/height, (iii) max (height/width, width/height), (iv) a function of height/width, and (v) a function of width/height.

3. The method of claim 1, wherein
    when the aspect ratio of the first block is within the aspect ratio range, the number of intra prediction modes in the subset of disabled intra prediction modes not included in the second set of intra prediction modes is a function of the aspect ratio, and
    the aspect ratio is one of (i) height/width, (ii) width/height, (iii) max (height/width, width/height), (iv) a function of height/width, and (v) a function of width/height.

4. The method of claim 1, wherein when the aspect ratio of the first block is greater than an upper threshold of the aspect ratio range, the subset of disabled intra prediction modes not included in the second set of intra prediction modes includes at least intra prediction modes 2-16.

5. The method of claim 1, wherein when the aspect ratio of the first block is less than a lower threshold of the aspect ratio range, the subset of disabled intra prediction modes not included in the second set of intra prediction modes includes at least intra prediction modes 52-66.

6. The method of claim 1, wherein
the first set of intra prediction modes includes angular prediction modes corresponding to angles within a range of 45° to −135° with respect to a vertical direction, and
the second set of intra prediction modes includes at least one angular prediction mode corresponding to an angle outside the range of 45° to −135° with respect to the vertical direction.

7. The method of claim 1, wherein:
when a width/height ratio of the first block equals 16 or 1/16, the number of intra prediction modes in the subset of disabled intra prediction modes not included in the second set of intra prediction modes is 13;
when the width/height ratio of the first block equals 32 or 1/32, the number of intra prediction modes in the subset of disabled intra prediction modes not included in the second set of intra prediction modes is 14; and
when the width/height ratio of the first block equals 64 or 1/64, the number of intra prediction modes in the subset of disabled intra prediction modes not included in the second set of intra prediction modes is 15.

8. The method of claim 1, further comprising:
when a size of a current block is N×4 or N×8, determining that the current block is vertically split, the first block being one of partitions of the current block; and
decoding a signal from the coded video bitstream that is indicative of a number of sub-partitions for vertically partitioning the current block.

9. The method of claim 1, wherein the aspect ratio range indicates a width/height ratio from 1/L to L, L being a positive value.

10. A method for video encoding in an encoder, the method comprising:
determining a first intra prediction mode of a first block in a first set of intra prediction modes for a square block, the first block being a non-square block;
when a width of the first block is greater than a height of the first block, adding a first value to a mode number associated with the first intra prediction mode to remap the first intra prediction mode to a second intra prediction mode in a second set of intra prediction modes for the non-square block, the second set of intra prediction modes not including a subset of disabled intra prediction modes that is a subset in the first set of intra prediction modes;
when the height of the first block is greater than the width of the first block, subtracting a second value from the mode number associated with the first intra prediction mode to remap the first intra prediction mode to the second intra prediction mode;
when an aspect ratio of the first block is out of an aspect ratio range, a number of intra prediction modes in the subset of disabled intra prediction modes is 15 or 16; and
encoding the first block in a bitstream according to the second intra prediction mode.

11. The method of claim 10, wherein
the aspect ratio is one of (i) height/width, (ii) width/height, (iii) max (height/width, width/height), (iv) a function of height/width, and (v) a function of width/height.

12. The method of claim 10, wherein
when the aspect ratio of the first block is within the aspect ratio range, the number of intra prediction modes in the subset of disabled intra prediction modes not included in the second set of intra prediction modes is a function of the aspect ratio, and
the aspect ratio is one of (i) height/width, (ii) width/height, (iii) max (height/width, width/height), (iv) a function of height/width, and (v) a function of width/height.

13. The method of claim 10, wherein when the aspect ratio of the first block is greater than an upper threshold of the aspect ratio range, the subset of disabled intra prediction modes not included in the second set of intra prediction modes includes at least intra prediction modes 2-16.

14. The method of claim 10, wherein when the aspect ratio of the first block is less than a lower threshold of the aspect ratio range, the subset of disabled intra prediction modes not included in the second set of intra prediction modes includes at least intra prediction modes 52-66.

15. The method of claim 10, wherein
the first set of intra prediction modes includes angular prediction modes corresponding to angles within a range of 45° to −135° with respect to a vertical direction, and
the second set of intra prediction modes includes at least one angular prediction mode corresponding to an angle outside the range of 45° to −135° with respect to the vertical direction.

16. The method of claim 10, wherein:
when a width/height ratio of the first block equals 16 or 1/16, the number of intra prediction modes in the subset of disabled intra prediction modes not included in the second set of intra prediction modes is 13;
when the width/height ratio of the first block equals 32 or 1/32, the number of intra prediction modes in the subset of disabled intra prediction modes not included in the second set of intra prediction modes is 14; and
when the width/height ratio of the first block equals 64 or 1/64, the number of intra prediction modes in the subset of disabled intra prediction modes not included in the second set of intra prediction modes is 15.

17. The method of claim 10, further comprising:
when a size of a current block is N×4 or N×8, determining that the current block is vertically split, the first block being one of partitions of the current block; and
encoding prediction information that is indicative of a number of sub-partitions for vertically partitioning the current block in the bitstream.

18. The method of claim 10, wherein the aspect ratio range indicates a width/height ratio from 1/L to L, L being a positive value.

19. A non-transitory computer readable medium storing a video media bitstream encoded by an encoding method, the encoding method comprising:
determining a first intra prediction mode of a first block in a first set of intra prediction modes for a square block, the first block being a non-square block;
when a width of the first block is greater than a height of the first block, adding a first value to a mode number associated with the first intra prediction mode to remap the first intra prediction mode to a second intra prediction mode in a second set of intra prediction modes for the non-square block, the second set of intra prediction modes not including a subset of disabled intra prediction modes that is a subset in the first set of intra prediction modes;

when the height of the first block is greater than the width of the first block, subtracting a second value from the mode number associated with the first intra prediction mode to remap the first intra prediction mode to the second intra prediction mode;

when an aspect ratio of the first block is out of an aspect ratio range, a number of intra prediction modes in the subset of disabled intra prediction modes is 15 or 16; and encoding the first block in a bitstream according to the second intra prediction mode.

20. The non-transitory computer readable medium of claim 19, wherein the aspect ratio is one of (i) height/width, (ii) width/height, (iii) max (height/width, width/height), (iv) a function of height/width, and (v) a function of width/height.

* * * * *